(12) United States Patent
Zhang et al.

(10) Patent No.: US 11,470,589 B2
(45) Date of Patent: Oct. 11, 2022

(54) COMMUNICATION METHOD AND COMMUNICATIONS APPARATUS

(71) Applicant: Huawei Technologies Co., Ltd., Shenzhen (CN)

(72) Inventors: Di Zhang, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 16/952,962

(22) Filed: Nov. 19, 2020

(65) Prior Publication Data
US 2021/0076372 A1    Mar. 11, 2021

Related U.S. Application Data

(63) Continuation of application No. PCT/CN2019/087837, filed on May 21, 2019.

(30) Foreign Application Priority Data

May 22, 2018 (CN) .......................... 201810497299.4

(51) Int. Cl.
*H04W 72/04* (2009.01)
*H04W 72/08* (2009.01)

(52) U.S. Cl.
CPC ..... *H04W 72/0413* (2013.01); *H04W 72/044* (2013.01); *H04W 72/085* (2013.01)

(58) Field of Classification Search
CPC ............... H04B 7/0695; H04L 5/0098; H04W 36/0079; H04W 36/06; H04W 72/0413;
(Continued)

(56) References Cited

U.S. PATENT DOCUMENTS

2018/0131493 A1    5/2018   Luo et al.
2019/0089579 A1*   3/2019   Sang .................... H04W 76/27
(Continued)

FOREIGN PATENT DOCUMENTS

CN      108012329 A    5/2018
WO      2017167304 A1  10/2017

OTHER PUBLICATIONS

InterDigital, Inc., "Remaining issues on beam failure recovery," 3GPP TSG RAN WG1 Meeting #92bis, Sanya, China, R1-1804846, total 3 pages, 3rd Generation Partnership Project, Valbonne, France (Apr. 16-20, 2018).

(Continued)

*Primary Examiner* — Kashif Siddiqui
(74) *Attorney, Agent, or Firm* — Leydig, Voit & Mayer, Ltd.

(57) ABSTRACT

A communication method and a communications apparatus are provided. The method includes: determining a first bandwidth part (BWP) and a second BWP; determining an association relationship between the first BWP and the second BWP; and recovering a link of a first downlink resource of the first BWP based on the association relationship and/or detecting a link failure of a second downlink resource of the second BWP based on the association relationship. The link of the first downlink resource of the first BWP can be accurately recovered based on the association relationship between the two BWPs, thereby ensuring communication reliability.

19 Claims, 11 Drawing Sheets

(58) Field of Classification Search
CPC ........... H04W 72/044; H04W 72/0453; H04W 72/046; H04W 72/085; H04W 76/18; H04W 76/19
See application file for complete search history.

(56) References Cited

U.S. PATENT DOCUMENTS

| | | | | |
|---|---|---|---|---|
| 2019/0222290 A1* | 7/2019 | Ly | ......................... | H04L 5/0048 |
| 2019/0261244 A1* | 8/2019 | Jung | ..................... | H04L 5/0053 |
| 2019/0306867 A1* | 10/2019 | Cirik | ................. | H04W 74/0833 |
| 2019/0349061 A1* | 11/2019 | Cirik | ..................... | H04L 1/1858 |
| 2020/0305168 A1* | 9/2020 | Liou | ................. | H04W 72/0493 |
| 2021/0013950 A1* | 1/2021 | Yang | ................. | H04W 74/0833 |
| 2021/0068191 A1* | 3/2021 | Liu | ................... | H04W 72/0446 |

OTHER PUBLICATIONS

Samsung, "Corrections on Beam Failure Recovery," 3GPP TSG RAN WG1 Meeting #92bis, Sanya, China, R1-1806716, total 4 pages, 3rd Generation Partnership Project, Valbonne, France (Apr. 16-20, 2018).

Qualcomm Incorporated, "Beam management for NR," 3GPP TSG-RAN WG1 Meeting 93, Busan, Korea, R1-1807341, total 11 pages, 3rd Generation Partnership Project, Valbonne, France (May 21-25, 2018).

"Remaining details of RLM," 3GPP TSG RAN WG1 Meeting #92b, R1-1803612, Sanya, China, Total 7 pages, 3rd Generation Partnership Project, Valbonne, France (Apr. 16-20, 2018).

"3rd Generation Partnership Project; Technical Specification Group Radio Access Network; NR; Radio Resource Control (RRC) protocol specification (Release 15)," 3GPP TS 38.331 V15.1.0, pp. 1-268, 3rd Generation Partnership Project, Valbonne, France (Mar. 2018).

"Remaining details on radio link monitoring," 3GPP TSG RAN WG1 Meeting #92, R1-1802677, Athens, Greece, pp. 1-4, 3rd Generation Partnership Project, Valbonne, France (Feb. 26-Mar. 2, 2018).

"Remaining issues for BWP inactivity timer," 3GPP TSG-RAN2 Meeting #101, R2-1801816, Athens, Greece, pp. 1-2, 3rd Generation Partnership Project, Valbonne, France (Feb. 26-Mar. 2, 2018).

"Remaining Issues on Beam Failure Recovery," 3GPP TSG RAN WG1 Meeting #92bis, R1-1804715, Sanya, China, pp. 1-7, 3rd Generation Partnership Project, Valbonne, France (Apr. 16-20, 2018).

* cited by examiner

COMMUNICATION METHOD AND COMMUNICATIONS APPARATUS

CROSS-REFERENCE TO RELATED APPLICATIONS

This application is a continuation of International Application No. PCT/CN2019/087837, filed on May 21, 2019, which claims priority to Chinese Patent Application No. 201810497299.4, filed on May 22, 2018. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

A high frequency band with a larger available bandwidth gradually becomes a candidate frequency band of a next-generation communications system, and a beamforming technology is used for signal transmission. Through a beam training process, a network device obtains several beam pair links (BPL) with better communication with a terminal device. However, because of blocking in a communication process and a poor diffraction capability in a high frequency channel, a current serving beam is blocked, and a signal cannot be further transmitted. To prevent communication from being suddenly interrupted when a beam is blocked, beam quality is detected, and a link is quickly recovered when the beam is blocked.

The network device may configure one or more downlink/uplink bandwidth parts (BWP) for the terminal device, and as shown in a schematic diagram of a BWP in FIG. 1, a plurality of bandwidth parts may overlap in frequency domain. The BWP is a subset of a bandwidth of the terminal device. The BWP includes consecutive physical resource blocks (PRB) in frequency domain. In other words, a minimum granularity of the BWP in frequency domain is one PRB.

In a case of a single carrier, one terminal device has only one active BWP at a same moment, and the terminal device can receive data/reference signals or send data/reference signals only in the active BWP.

Dynamic switching between BWPs is supported in a current communications system. The network device indicates, by using downlink control information (DCI) or radio resource control (RRC) signaling, the terminal device to perform BWP switching. Specifically, FIG. 2 is a schematic diagram of dynamic switching between BWPs. The DCI is located in a current BWP, and a size of a frequency domain resource allocation information field of the DCI is determined by a bandwidth of the current BWP. There is an information field of a bandwidth part indicator in the DCI, and the information field is used to indicate an ID number of a BWP to be activated by the terminal device. When the BWP ID number indicated by the information field is inconsistent with an ID number of a BWP (namely, the current BWP for transmitting the DCI) currently activated by the terminal device, the terminal device needs to switch from the current BWP to a BWP indicated by the DCI.

However, in the prior art, if DCI information for indicating BWP switching is received during beam failure recovery (BFR), namely, link recovery, the terminal device directly switches to a new BWP, and does not continue to perform the link recovery in a BWP used before switching. Currently, it is not clear whether the BFR further continues to be performed after the terminal device switches to the new BWP. In addition, if beam information of the BWP used before switching is still used for a physical downlink control channel (PDCCH) in the new BWP, communication cannot be performed in the new BWP.

Therefore, how to determine whether to further recover a link of a downlink resource of the BWP used before switching is a problem that needs to be resolved in this application.

SUMMARY

This application provides a communication method and a communications apparatus, to accurately determine whether a link of a downlink resource of a BWP used before switching needs to be recovered.

According to a first aspect, a communication method is provided, including: determining a first bandwidth part BWP and a second BWP; determining an association relationship between the first BWP and the second BWP; and recovering a link of a first downlink resource of the first BWP based on the association relationship and/or detecting a link failure of a second downlink resource of the second BWP based on the association relationship.

The first BWP and the second BWP may be located on a same carrier, or may be located on different carriers.

The association relationship may be a QCL relationship.

In this aspect, whether to recover the link of the first downlink resource of the first BWP can be accurately determined based on the association relationship between the two BWPs, or a specific BWP used to recover the link of the first downlink resource of the first BWP can be accurately determined based on the association relationship between the two BWPs, thereby ensuring communication reliability.

In an implementation, the method further includes: receiving BWP switching indication information, where the BWP switching indication information is used to indicate to switch from the first BWP to the second BWP.

In another implementation, the recovering a link of a first downlink resource of the first BWP based on the association relationship includes: recovering the link of the first downlink resource in the second BWP; or recovering the link of the first downlink resource in the first BWP.

In this implementation, if there is the association relationship between the first BWP and the second BWP, a TCI may be configured across BWPs. After BWP switching is performed, some configuration information of the first BWP may continue to be used in the second BWP, and the link of the first BWP is recovered in the second BWP, thereby reducing configuration signaling.

Alternatively, in this implementation, if there is the association relationship between the first BWP and the second BWP, a TCI may be configured across BWPs, the TCI of the first BWP may be configured in the second BWP, and the link of the first BWP is recovered in the second BWP, thereby ensuring link failure recovery reliability.

In still another implementation, the recovering the link of the first downlink resource in the second BWP includes: recovering the link of the first downlink resource in the second BWP based on a relationship between the first downlink resource and the second downlink resource.

In still another implementation, the recovering the link of the first downlink resource in the second BWP based on a relationship between the first downlink resource and the second downlink resource includes: if the first downlink resource and the second downlink resource do not intersect, recovering the link of the first downlink resource in the second BWP, and detecting the link failure of the second downlink resource; or if the first downlink resource and the second downlink resource partially intersect, recovering the link of the first downlink resource in the second BWP, or recovering, in the second BWP, a link of a first downlink resource that intersects the second downlink resource, and detecting the link failure of the second downlink resource; or if the second downlink resource is a subset of the first downlink resource, recovering in the second BWP, a link of a first downlink resource that intersects the second downlink resource; or if the first downlink resource is a subset of the second downlink resource of the second BWP, recovering the link of the first downlink resource in the second BWP, and detecting a link failure of a second downlink resource that does not intersect the first downlink resource.

In still another implementation, the recovering the link of the first downlink resource in the second BWP includes: suspending the recovery of the link of the first downlink resource; and continuing to recover the link of the first downlink resource after switching to the second BWP.

In still another implementation, the suspending the recovery of the link of the first downlink resource includes: suspending a link recovery timer and/or a link recovery counter, and/or suspending sending of link recovery request information; and the continuing to recover the link of the first downlink resource after switching to the second BWP includes: after switching to the second BWP, starting or restarting the link recovery timer and/or the link recovery counter, and/or sending the link recovery request information.

In still another implementation, the method further includes: determining the link failure of the second downlink resource after detecting the link failure of the second downlink resource.

In still another implementation, the method further includes: when the link failure of the second downlink resource occurs before a link recovery response of the first downlink resource is received or before reconfiguration information of the first downlink resource is received, resetting the link recovery timer and/or the link recovery counter, and/or stopping sending link recovery request information of the first downlink resource.

In still another implementation, the recovering the link of the first downlink resource in the second BWP includes: sending the link recovery request information of the first downlink resource on a physical uplink control channel resource or a physical uplink shared channel resource of the second BWP; and/or sending link recovery request information of the second downlink resource on a physical random access resource of the second BWP.

In this implementation, the link recovery request information of the first BWP or the link recovery request information of the second BWP can be distinguished by using a type of an uplink resource.

In still another implementation, the recovering the link of the first downlink resource in the second BWP includes: sending the link recovery request information of the first downlink resource and/or link recovery request information of the second downlink resource on a physical random access resource, a physical uplink control channel resource, or a physical uplink shared channel resource of the second BWP, where the link recovery request information may include one or more of the following information: BWP identification information, CC identification information, identification information of a downlink resource, or resource identification information of a reference signal associated with the downlink resource.

In still another implementation, after the link of the first downlink resource is recovered, the method further includes: associating the first downlink resource with a reference signal resource associated with received link recovery response information. To be specific, information (for example, a PDCCH) carried on the first downlink resource is received based on the reference signal resource associated with the received link recovery response information. In still another implementation, the method further includes: when the BWP switching indication information is received, skipping switching to the second BWP.

In still another implementation, the recovering the link of the first downlink resource in the first BWP includes: sending the link recovery request information of the first downlink resource in the first BWP, and/or receiving link recovery response information of the first downlink resource, and/or receiving the reconfiguration information of the first downlink resource.

In still another implementation, the method further includes: switching from the first BWP to the second BWP after the link recovery response information or the reconfiguration information is received.

In still another implementation, the recovering the link of the first downlink resource in the first BWP includes: switching from the first BWP to the second BWP after the link recovery timer expires and/or the link recovery counter reaches a maximum value.

In still another implementation, the first downlink resource is a control resource set, and/or the second downlink resource is a control resource set.

According to a second aspect, a communication method is provided, including: sending BWP switching indication information, where the BWP switching indication information is used to indicate to switch from a first BWP to a second BWP; and receiving link recovery request information of a first downlink resource of the first BWP.

In an implementation, the receiving link recovery request information of a first downlink resource of the first BWP includes: receiving the link recovery request information of the first downlink resource of the first BWP in the second BWP; or receiving the link recovery request information of the first downlink resource of the first BWP in the first BWP.

In another implementation, the receiving the link recovery request information of the first downlink resource of the first BWP in the second BWP includes: receiving the link recovery request information of the first downlink resource of the first BWP on a physical uplink control channel resource or a physical uplink shared channel resource of the second BWP; and/or receiving the link recovery request information of the first downlink resource of the first BWP on a physical random access resource of the second BWP.

In still another implementation, the receiving link recovery request information of a first downlink resource of the first BWP includes: receiving the link recovery request information of the first downlink resource of the first BWP on a physical random access resource, a physical uplink control channel resource, or a physical uplink shared channel resource of the second BWP, and/or receiving link recovery request information of the second downlink resource, where the request information includes one or more of the following information: BWP identification information, identification information of a downlink resource, or resource identification information of a reference signal associated with the downlink resource.

In still another implementation, the receiving the link recovery request information of the first downlink resource of the first BWP in the first BWP includes: receiving the link recovery request information of the first downlink resource in the first BWP, and/or sending link recovery response information of the first downlink resource, and/or sending reconfiguration information of the first downlink resource.

According to a third aspect, a communication method is provided, including: sending link recovery request information on a physical random access resource, and performing timing of a bandwidth part BWP inactivity timer; or sending link recovery request information on a physical random access resource, stopping a bandwidth part BWP inactivity timer, and starting or restarting the BWP inactivity timer after a link recovery timer expires and/or a link recovery counter reaches a maximum value.

In this aspect, if detecting a link failure during the timing of the BWP inactivity timer, a terminal device initiates link recovery, does not stop the timing of the BWP inactivity timer, and when the BWP inactivity timer expires, switches to a preset BWP, thereby ensuring normal communication and improving communication stability. Alternatively, the terminal device stops or suspends the timing of the BWP inactivity timer, and after a link recovery process is completed, starts or restarts the timing of the BWP inactivity timer, thereby ensuring timing accuracy.

In an implementation, the method further includes: when the BWP inactivity timer expires, switching to the preset BWP.

According to a fourth aspect, a communications apparatus is provided, where the communications apparatus can implement the communication method according to the first aspect or the third aspect. For example, the communications apparatus may be a chip (such as a baseband chip or a communications chip) or a terminal device, and may implement the foregoing method by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (instruction) and/or data that are/is necessary for the apparatus. Optionally, the communications apparatus may further include a communications interface, configured to support communication between the apparatus and another network element.

In another possible implementation, the communications apparatus may include a unit and a module that perform a corresponding action in the foregoing method.

In still another possible implementation, a processor and a transceiver apparatus are included. The processor is coupled to the transceiver apparatus. The processor is configured to execute a computer program or an instruction, to control the transceiver apparatus to receive and send information, and when the processor executes the computer program or the instruction, the processor is further configured to implement the foregoing method. The transceiver apparatus may be a transceiver, a transceiver circuit, or an input/output interface. When the communications apparatus is a chip, the transceiver apparatus is a transceiver circuit or an input/output interface.

When the communications apparatus is a chip, a sending unit may be an output unit, for example, an output circuit or a communications interface; and a receiving unit may be an input unit, for example, an input circuit or a communications interface. When the communications apparatus is a terminal device, a sending unit may be a transmitter or a transmitting machine, and a receiving unit may be a receiver or a receiving machine.

According to a fifth aspect, a communications apparatus is provided, where the communications apparatus can implement the communication method according to the second aspect. For example, the communications apparatus may be a chip (such as a baseband chip or a communications chip) or a network device, and may implement the foregoing method by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (instruction) and data that are necessary for the apparatus. Optionally, the communications apparatus may further include a communications interface, configured to support communication between the apparatus and another network element.

In another possible implementation, the communications apparatus may include a unit and a module that perform a corresponding action in the foregoing method.

In still another possible implementation, a processor and a transceiver apparatus are included. The processor is coupled to the transceiver apparatus. The processor is configured to execute a computer program or an instruction, to control the transceiver apparatus to receive and send information, and when the processor executes the computer program or the instruction, the processor is further configured to implement the foregoing method. The transceiver apparatus may be a transceiver, a transceiver circuit, or an input/output interface. When the communications apparatus is a chip, the transceiver apparatus is a transceiver circuit or an input/output interface.

When the communications apparatus is a chip, a receiving unit may be an input unit, for example, an input circuit or a communications interface; and a sending unit may be an output unit, for example, an output circuit or a communications interface. When the communications apparatus is a network device, a receiving unit may be a receiver (which may also be referred to as a receiving machine); and a sending unit may be a transmitter (which may also be referred to as a transmitting machine).

According to a sixth aspect, a computer-readable storage medium is provided. The computer-readable storage medium stores an instruction, and when the instruction is run on a computer, the computer is enabled to perform the methods according to the foregoing aspects.

According to a seventh aspect, a computer program product including an instruction is provided. When the computer program product runs on a computer, the computer is enabled to perform the methods according to the foregoing aspects.

BRIEF DESCRIPTION OF DRAWINGS

To describe the technical solutions in embodiments of the present invention or in the background more clearly, the following describes the accompanying drawings for describing the embodiments of the present invention or the background.

FIG. 5 is a schematic diagram of an example of CORESETs included in a BWP used before switching and a BWP that is switched to;

FIG. 7 is a schematic diagram of another example of CORESETs included in a BWP used before switching and a BWP that is switched to;

FIG. 8 is a schematic diagram of still another example of CORESETs included in a BWP used before switching and a BWP that is switched to;

FIG. 9 is a schematic diagram of yet another example of CORESETs included in a BWP used before switching and a BWP that is switched to;

DESCRIPTION OF EMBODIMENTS

The following describes embodiments of this application with reference to the accompanying drawings in the embodiments of this application.

Figure 1:
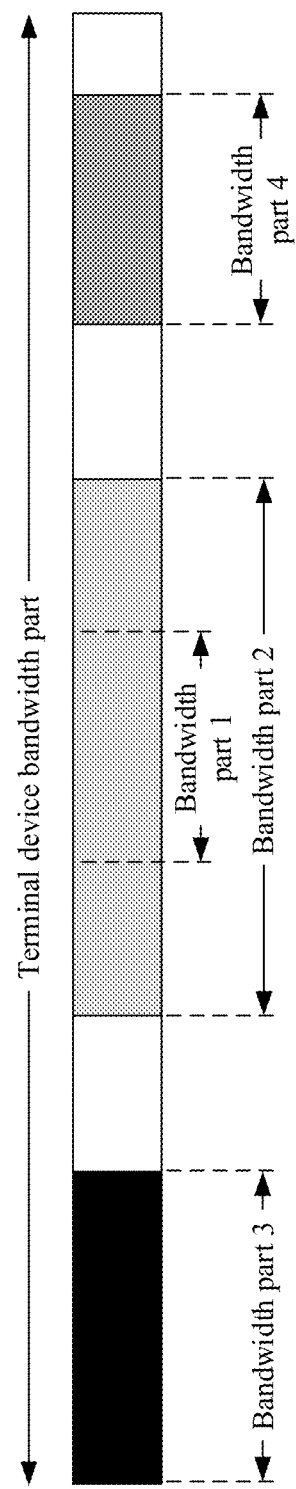
FIG. 1 is a schematic diagram of a BWP.
Figure 2:
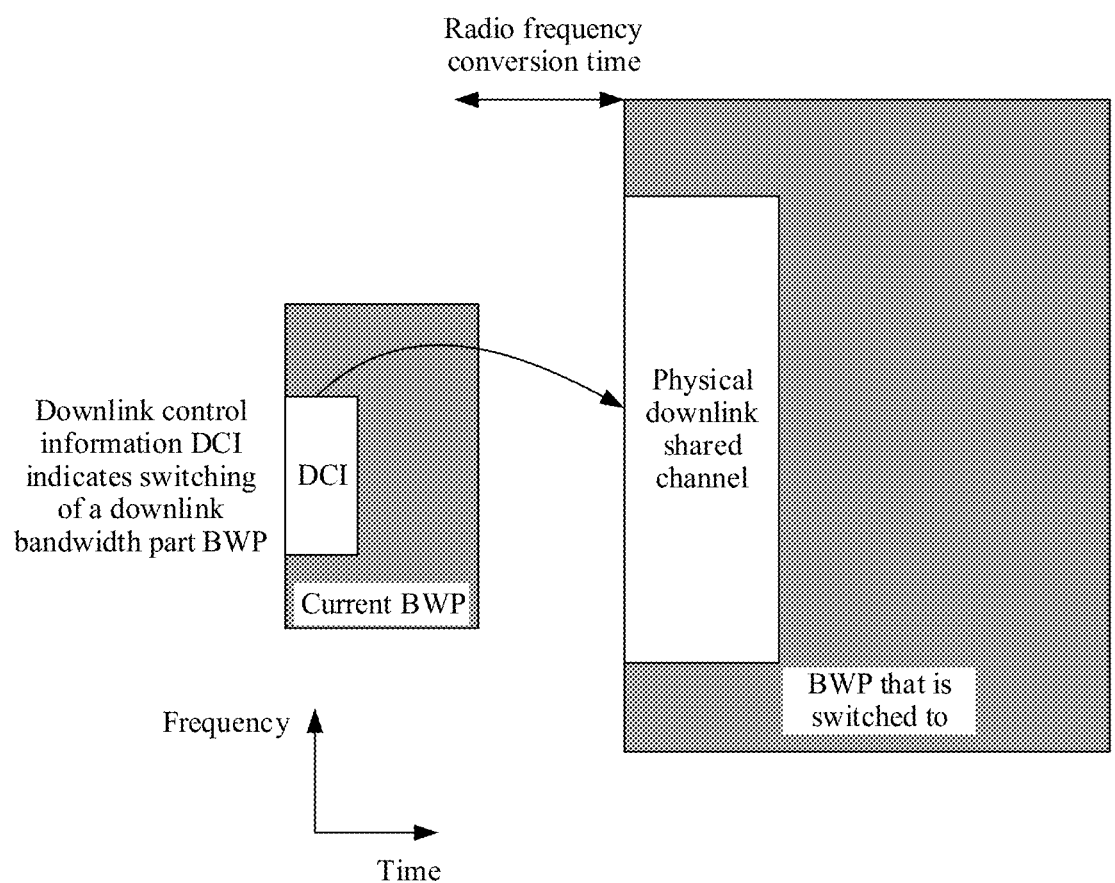
FIG. 2 is a schematic diagram of dynamic switching between BWPs.
Figure 3:
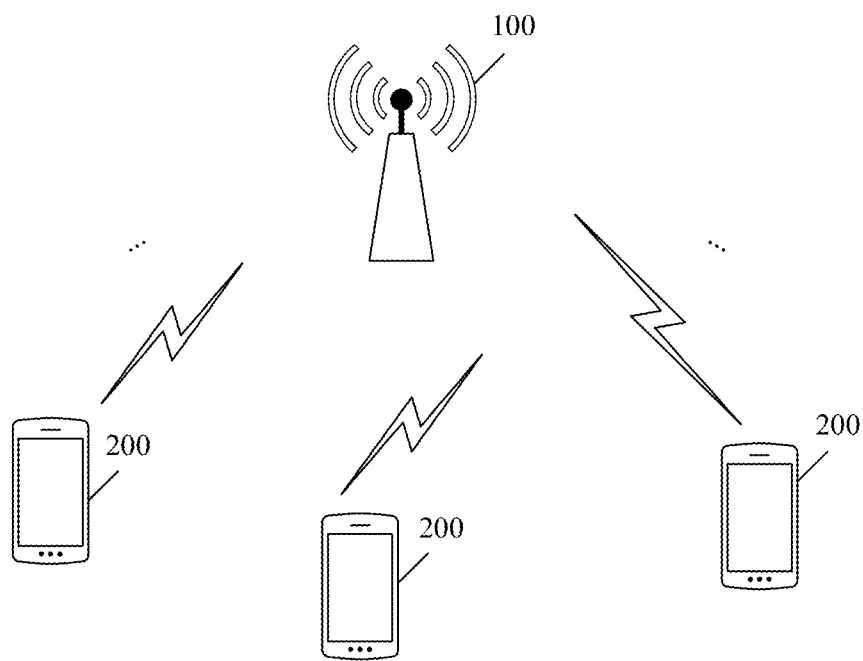
FIG. 3 is a schematic diagram of a communications system according to this application.

FIG. 3 is a schematic diagram of a communications system according to this application. The communications system may include at least one network device 100 (only one is shown) and one or more terminal devices 200 connected to the network device 100.

The network device 100 may be a device that can communicate with the terminal device 200. The network device 100 may be any device having a wireless transceiver function. The network device 100 includes but is not limited to a base station NodeB, an evolved NodeB eNodeB, a base station in a fifth generation (5G) communications system, a base station or network device in a future communications system, an access node in a Wi-Fi system, a wireless relay node, a wireless backhaul node, and the like. Alternatively, the network device 100 may be a radio controller in a cloud radio access network (CRAN) scenario. The network device 100 may alternatively be a small cell, a transmission reference point (TRP), or the like. A specific technology and a specific device form that are used by the network device are not limited in the embodiments of this application.

The terminal device 200 is a device having a wireless transceiver function. The terminal device 200 may be deployed on land, including an indoor or outdoor device, a hand-held device, a wearable device, or a vehicle-mounted device, may be deployed on the water surface, for example, on a ship, or may be deployed in the air, for example, on an airplane, a balloon, or a satellite. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. The terminal device may also be referred to as user equipment (UE), an access terminal device, a UE unit, a mobile station, a mobile console, a remote station, a remote terminal device, a mobile device, a terminal, a wireless communications device, a UE proxy, a UE apparatus, or the like sometimes.

It should be noted that, terms "system" and "network" in the embodiments of the present invention may be used interchangeably. "A plurality of" means two or more. In view of this, "a physical of" may also be understood as "at least two" in the embodiments of the present invention. The term "and/or" describes an association relationship for describing associated objects and indicates that three relationships may exist. For example, A and/or B may indicate the following three cases: Only A exists, both A and B exist, and only B exists. In addition, unless otherwise specified, the character "/" generally indicates an "or" relationship between the associated objects.

A Reference Signal Resource Set Used for Beam Failure Detection and a Candidate Reference Signal Resource Set:

To detect and recover a link fault, a network device needs to configure, for a terminal, a reference signal resource set (for example, a Beam-Failure-Detection-RS-ResourceConfig, a Beam-Failure-Detection-RS, or failureDetectionResources) used for beam failure detection and a reference signal resource set (a candidate beam RS list, a Candidate-Beam-RS-Identification-Resource, a beamFailureCandidateBeamResource, or a Candidate-Beam-Identification-RS) (which is also referred to as a candidate reference signal resource set) used to recover a link between the terminal device and the network device.

In addition, a reference signal used to detect a link failure may alternatively be indicated in an implicit manner. Some reference signals associated with a transmission configuration indicator (TCI) indicating a PDCCH are used as reference signals used to detect the link failure, and the reference signals are Type D QCLed with PDCCH DMRSs and are periodically sent reference signals. A demodulation reference signal (DMRS) of the PDCCH and a reference signal in the TCI have a QCL relationship.

When channel quality information (such as RSRP, a CQI, a BLER, an SINR, and an SNR) of a part or all of reference signals in the set is less than a preset threshold, a communications link fault is determined. That channel quality information is less than a preset threshold may be that the channel quality information is less than the preset threshold for W consecutive times or is less than the preset threshold for W times within a specific time period. Optionally, the preset threshold may be the same as a threshold of a radio link failure. In this application, the communications link fault may also be referred to as a communications link failure, a beam failure, a link fault, a link failure, a communication fault, a communication failure, or the like. In this application, these concepts have a same meaning. After a communications link is faulty, the terminal device needs to select, from the candidate reference signal resource set, a reference signal resource whose channel quality information (such as RSRP and a CQI) is greater than the preset threshold, to recover the communications link. Optionally, the preset threshold may be configured by the network device. Herein, the reference signal used to detect the link failure is used by the terminal device to detect channel quality of a transmit beam of the network device, and the transmit beam is a beam used when the network device communicates with the terminal. The candidate reference signal resource set is a reference signal resource set used by the terminal to initiate link reconfiguration after the terminal determines that a communications link fault occurs on the transmit beam of the network device. In this application, the link reconfiguration may also be referred to as recovery of communication between the network device and the terminal device, link recovery, beam failure recovery, communications link recovery, link fault recovery, communication fault recovery, or communication failure recovery. In specific implementation, the two sets: the reference signal resource set used for the beam failure detection and the reference signal resource set used to recover the link between the terminal device and the network device may alternatively have other names. This is not specifically limited in this application. In this application, link reconfiguration request information may also be referred to as recovery request information of a communications link fault (or referred to as a communications link failure, a beam fault, a beam failure, a link fault, a link failure, a communication fault, a communication failure, a link, a communications link, or the like), reconfiguration request information, or the like.

Quasi Co-Site/Quasi Co-Location Assumption Information:

Quasi co-site/Quasi co-location assumption information may also be referred to as quasi co-location (QCL) assumption information. The QCL information is used to assist in describing receive side beamforming information and a receiving procedure of a terminal device.

To reduce QCL information indication overheads of a network device side for a terminal device side, in an optional implementation, the network device side may indicate that a demodulation reference signal on a PDSCH or a PDCCH has a QCL relationship with one or more of a plurality of reference signal resources previously reported by the terminal device. For example, the reference signal may be a channel state information reference signal (CSI-RS). Herein, each reported CSI-RS resource index corresponds to a transmit-receive beam pair that is previously established during measurement performed by using a CSI-RS resource. It should be understood that, information about a receive beam of two reference signals or channels that have a QCL relationship is the same. Therefore, the terminal device may infer, based on the reference signal resource index, information about a receive beam for receiving the PDCCH or the PDSCH. For example, a receive beam used by the terminal device to receive the DMRS is the same as a receive beam in a plurality of CSI-RS measurement-based transmit-receive beam pairs previously reported by the terminal device.

The information may include one or more of a beam group index number of the reference signal, a resource index number of the reference signal, a port number of the reference signal, and a port group number of the reference signal that are reported by the terminal device.

Optionally, the QCL information may also include some spatial characteristic parameters, for example, an angle of arrival (AoA), a dominant angle of arrival (dominant AoA), an average angle of arrival, a power angular spectrum of an angle of arrival (PAS of AoA), an angle of departure (AoD), a dominant angle of departure, an average angle of departure, a power angular spectrum of an angle of departure, terminal transmit beamforming, terminal receive beamforming, spatial channel correlation, base station transmit beamforming, base station receive beamforming, an average channel gain, an average channel delay (average delay), delay spread, Doppler spread, a Doppler frequency shift (Doppler shift), and spatial reception parameters (spatial Rx parameters). These spatial characteristic parameters describe spatial channel characteristics of antenna ports between the two reference signals, and this helps the terminal device complete a receiver-side beamforming process or a receiving processing process based on the QCL information.

Control Resource Set (CORESET):

To improve efficiency of blindly detecting a control channel by a terminal device, a concept of a control resource set is proposed. A network device may configure one or more resource sets for the terminal device, to send a PDCCH. The network device may send the control channel to the terminal device on any control resource set corresponding to the terminal device. In addition, the network device further needs to notify the terminal device of another configuration associated with the control resource set, for example, search space. Configuration information of each control resource set is different, for example, a frequency domain width difference and a time domain length difference.

Beam

In this application, a beam may correspond to a time resource or a spatial resource.

Optionally, the beam may also correspond to a reference signal resource (for example, a reference signal resource for beamforming) or beamforming information.

Optionally, the beam may further correspond to information associated with a reference signal resource of a network device. A reference signal may be a CSI-RS, a synchronization signal/broadcast channel block (synchronization signal/PBCH block, SS block), a demodulation reference signal (DMRS), a phase tracking signal (PTRS), a tracking signal (tracking reference signal, TRS), or the like. The information associated with the reference signal resource may be a reference signal resource identifier, QCL information, or the like.

The reference signal resource identifier corresponds to a transmit-receive beam pair that is previously established during measurement performed by using the reference signal resource. The terminal may infer beam information by using the reference signal resource index.

This application provides a communication method and a communications apparatus. A link of a first downlink resource of a first BWP can be accurately recovered in a second BWP based on an association relationship between the two BWPs, thereby ensuring communication reliability.

Figure 4:
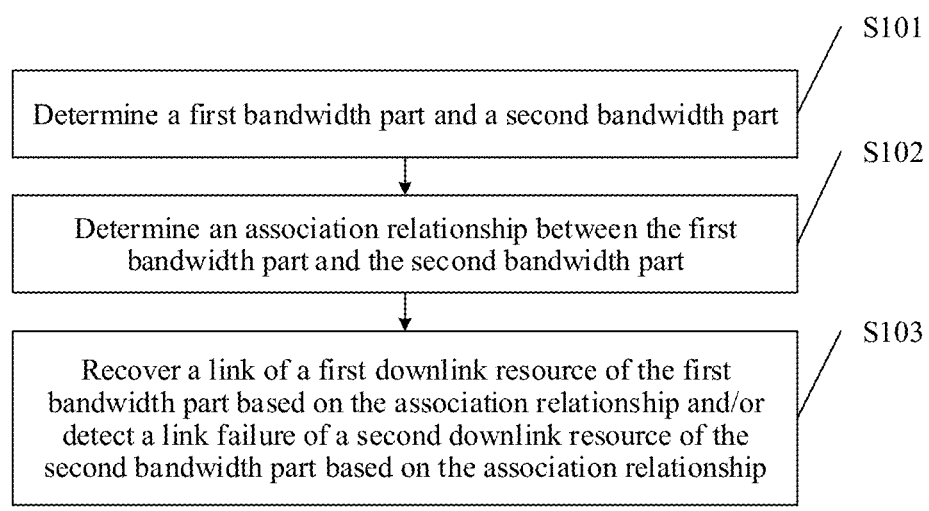
FIG. 4 is a schematic flowchart of a communication method according to an embodiment of this application.

FIG. 4 is a schematic flowchart of a communication method according to an embodiment of this application. Details are shown in FIG. 4.

S101: Determine a first BWP and a second BWP.

In this embodiment, the first BWP and the second BWP may be two BWPs on a same component carrier (CC), or may be two BWPs on different CCs.

S102: Determine an association relationship between the first BWP and the second BWP.

Herein, the association relationship may mean that there is a potential association relationship between some parameters of the first BWP and some parameters of the second BWP. Alternatively, the association relationship may be determined by a terminal device, or may be predefined. The terminal device may determine the association relationship between the first BWP and the second BWP based on some parameters of the first BWP or some parameters of the second BWP.

Alternatively, the association relationship may be configured by a network device, may be implicitly determined based on some information, or may be directly configured for the terminal device to indicate an association relationship between (a parameter of) the first BWP and (a parameter of) the second BWP. The network device may configure the association relationship by using RRC, a MAC-CE, DCI, or the like.

Specifically, the association relationship may include at least one of the following:

The first BWP and the second BWP partially or completely overlap in frequency domain.

A reference signal configured for the first BWP and a reference signal configured for the second BWP have a QCL relationship.

The first BWP and the second BWP include a same control resource set.

The first BWP and the second BWP are BWPs in a same frequency band.

S103: Recover a link of a first downlink resource of the first BWP based on the association relationship and/or detect a link failure of a second downlink resource of the second BWP based on the association relationship.

A scenario in this application may be directed at a case in which there are a plurality of BWPs. In a first scenario, in a case of a same carrier CC, there can be only one active BWP at one moment in the prior art. Therefore, two BWPs used before and after switching or a candidate BWP that may be used in switching are/is involved. In a second scenario, in a case of a plurality of carriers, the terminal device may be indicated to switch between a plurality of carriers CCs, that is, switch between a plurality of BWPs. Therefore, BWPs respectively corresponding to two CCs used before and after switching are involved. In a third scenario, in a case of multi-carrier aggregation, one terminal device may access a plurality of CCs, namely, a plurality of BWPs. In other words, there may be a plurality of active BWPs. In this case, a concept of BWP switching or carrier switching may not be involved, but a process in which one CC is used to assist in link recovery of another CC involved. The solutions in this application are applicable to the foregoing plurality of scenarios. For the first scenario and the second scenario, the first BWP or a BWP 1 described in this embodiment may be a BWP used before the switching. The second BWP or a BWP 2 described in this embodiment may be a BWP that is switched to. For the third scenario, the first BWP or a BWP 1 described in this embodiment may be a BWP on the CC for which the link recovery is assisted in. The second BWP or a BWP 2 described in this embodiment may be a BWP on the other CC that is used to assist in the link recovery.

It should be understood that "BWP" in this application may be replaced with "CC".

Each CC corresponds to an independent cell, and a terminal device for which carrier aggregation (CA) is configured is connected to one Pcell or sPcell (namely, a primary cell) and a plurality of SCells (namely, secondary cells). The Pcell or the sPcell is an initially accessed cell. An SCell is configured by using RRC signaling after access, to provide more radio resources.

In the following description of this embodiment, BWP switching is used as an example for description. In this embodiment, the network device sends BWP switching indication information to the terminal device. The terminal device receives the BWP switching indication information (in a carrier switching scenario, the terminal device receives carrier switching indication information sent by the network device). The BWP switching indication information is used to indicate to switch from the first BWP to the second BWP.

The terminal device measures a reference signal resource set used for beam failure detection, and finds that channel quality information of reference signal resources used for the beam failure detection, or channel quality information of some or all reference signals in the reference signal resource set used for the beam failure detection is less than a preset threshold for a plurality of consecutive times, and the terminal device determines a beam failure or a link failure. Then, the terminal device measures channel quality information in a candidate reference signal resource set, and identifies and obtains a reference signal whose channel quality information is greater than the preset threshold. The terminal device sends link recovery request information to the network device by using the identified reference signal whose channel quality information is greater than the preset threshold. The terminal device may explicitly or implicitly notify the network device of newly identified beam information or a newly identified reference signal resource. A medium access control (MAC) layer of the terminal device maintains a beam failure recovery timer, namely, a link recovery timer, and a beam failure recovery counter, namely, a link recovery counter. The link recovery timer is used to control an entire link recovery time. The link recovery counter is used to limit a quantity of times of sending a link recovery request by the terminal device. When the link recovery timer expires or the link recovery counter reaches a maximum value, the terminal device considers that link recovery fails, and stops a link recovery process. The terminal device detects a CORESET, and receives link recovery response information. Different from the CORESET defined above, the CORESET is a dedicated CORESET resource configured by the network device for the terminal device, and is used, during the link failure, by the network device to send, after the terminal device sends the link recovery request information, the link recovery response information for the downlink control resource.

After detecting the link failure or in the link recovery process, the terminal device receives the BWP switching indication information that is sent by the network device by using information or signaling such as DCI or RRC (in the carrier switching scenario, the terminal device receives the carrier switching indication information sent by the network device).

The terminal device recovers the link of the first downlink resource of the first BWP based on the association relationship between the first BWP and the second BWP.

In an embodiment, step S102 may be a determining process, and step S102 may be replaced with: determining whether there is an association relationship between the first BWP and the second BWP. In addition, step S103 is replaced with: recovering a link of a first downlink resource of the first BWP based on a determining result, and/or detecting a link failure of a second downlink resource of the second BWP based on the determining result. If there is the association relationship between the first BWP and the second BWP, the link of the first downlink resource is recovered in the second BWP; or if there is no association relationship between the first BWP and the second BWP, the link of the first downlink resource is recovered in the first BWP. To be specific, if there is no association relationship between the first BWP and the second BWP, link recovery request information of the first downlink resource is sent in the first BWP, and/or link recovery response information of the first downlink resource is received, and/or reconfiguration information of the first downlink resource is received.

In another embodiment, if there is no association relationship between the first BWP and the second BWP, when the BWP switching indication information is received, the terminal device skips switching to the second BWP.

In another embodiment, if there is no association relationship between the first BWP and the second BWP, the recovering the link of the first downlink resource in the first BWP includes:

sending the link recovery request information of the first downlink resource in the first BWP, and/or receiving the link recovery response information of the first downlink resource, and/or receiving the reconfiguration information of the first downlink resource.

In an optional embodiment, after the link recovery response information or the reconfiguration information is received, switching is performed from the first BWP to the second BWP.

In another embodiment, if there is no association relationship between the first BWP and the second BWP, the recovering the link of the first downlink resource in the first BWP includes: switching from the first BWP to the second BWP after the link recovery timer expires and/or the link recovery counter reaches the maximum value.

For example, the association relationship may be a QCL relationship between the first BWP and the second BWP.

Herein, that there is the QCL relationship between the BWP 1 and the BWP 2 mainly indicates that a TCI may be configured across BWPs. One TCI state may include one or two referenced reference signals and an associated QCL type. QCL types may be classified into four categories: A, B, C, and D, which are different combinations or selections of {Doppler shift, Doppler spread, average delay, delay spread, and spatial Rx parameter}. The TCI state includes QCL information, or the TCI state is used to indicate QCL information of a PDCCH/CORESET or a PDSCH, and specifically, is used to indicate that a demodulation reference signal (DMRS) of the PDCCH/CORESET or the PDSCH and a reference signal included in the TCI have a QCL relationship. The TCI state is mainly used to indicate that when a PDCCH/PDSCH is received, information such as a spatial reception parameter of the PDCCH/PDSCH is the same as that of the reference signal included in the TCI state. The QCL relationship may be configured by the network device.

If there is the QCL relationship between the BWP 1 and the BWP 2, because the TCI may be configured across the BWPs, a link of a downlink resource of the BWP 1 may be recovered in the BWP 2. If there is no QCL relationship between the BWP 1 and the BWP 2, because the TCI cannot be configured across the BWPs, a link of a downlink resource of the BWP 1 is recovered in the BWP 1. It should be noted that the link recovery herein may be continued recovery or restarted recovery. Detailed descriptions are provided below.

It should be noted that if the BWP 1 and the BWP 2 belong to different CCs, a CC in which the BWP 1 is located may be used to assist in the link recovery of a CC in which the BWP 2 is located. In this case, after determining a link failure of a first CC, the terminal device may send link failure recovery request information on an uplink resource (a PUCCH or a PUSCH) of a second CC, and the link failure recovery request information is used to indicate a first CC identifier and/or a reference signal resource identifier. The reference signal resource identifier is used to recover the link failure of the first CC.

The terminal device sends the link recovery request information to the network device on a physical random access channel (PRACH) resource or a physical uplink control channel (PUCCH) resource, to perform the link recovery.

Herein, the downlink resource (that is, the first downlink resource) of the BWP 1 is a resource associated with a physical downlink control channel.

The resource associated with the physical downlink control channel may be a beam pair associated with the physical downlink control channel, or may be a time-frequency resource and/or a space resource that are/is associated with the physical downlink control channel, or may be a reference signal resource associated with the physical downlink control channel, or may be a resource associated with a reference signal resource associated with the physical downlink control channel. This is not particularly limited in this embodiment of this application.

Specifically, the first downlink resource may be a first control resource set. The control resource set may be a CORESET, a control region, an ePDCCH set, or the like. An example in which the first downlink resource is a CORESET is used below for description.

In addition, when the link of the downlink resource of the first BWP is recovered, the link failure may also occur on a link of the downlink resource of the second BWP. Therefore, the link failure of the downlink resource of the second BWP needs to be detected based on the association relationship between the first BWP and the second BWP. Specifically, after the link failure of the second downlink resource is detected, the link failure of the second downlink resource is determined.

The terminal device recovers the link of the first downlink resource in the second BWP based on a relationship between the first downlink resource and the second downlink resource. Specifically, the first downlink resource may include one or more CORESETs, and links of some or all CORESETs may be recovered in the BWP 2. The following provides specific descriptions based on a case of CORESETs included in the BWP 1 and the BWP 2.

Figure 5:
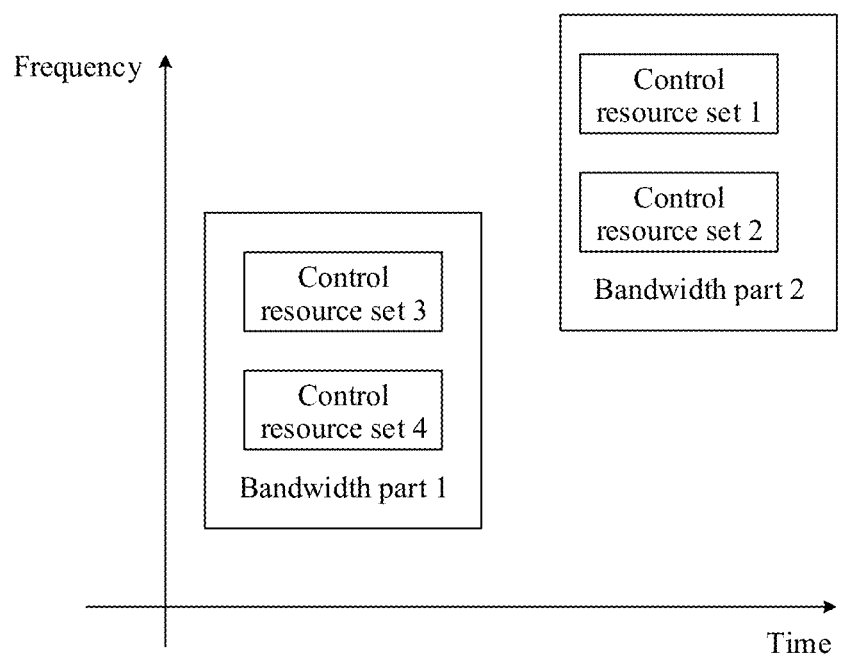

FIG. 5 is a schematic diagram of a case of CORESETs included in a BWP 1 and a BWP 2. In FIG. 5, the BWP 1 includes a CORESET 3 and a CORESET 4, and the BWP 2 includes a CORESET 1 and a CORESET 2. It can be learned that there is no intersection between the CORESETs included in the BWP 1 and the CORESETs included in the BWP 2; in other words, the BWP 1 and the BWP 2 do not include a same CORESET.

The terminal device detects a link failure in the BWP 1. In this case, the terminal device suspends the recovery of the link of the first downlink resource of the BWP 1. After switching to a new BWP, the terminal device continues to recover the link of the first downlink resource of the BWP 1. To be specific, the terminal device continues to recover the link of the first downlink resource of the BWP 1 in the BWP 2. Further, the terminal device detects the link failure of the second downlink resource of the BWP 2.

Figure 6:
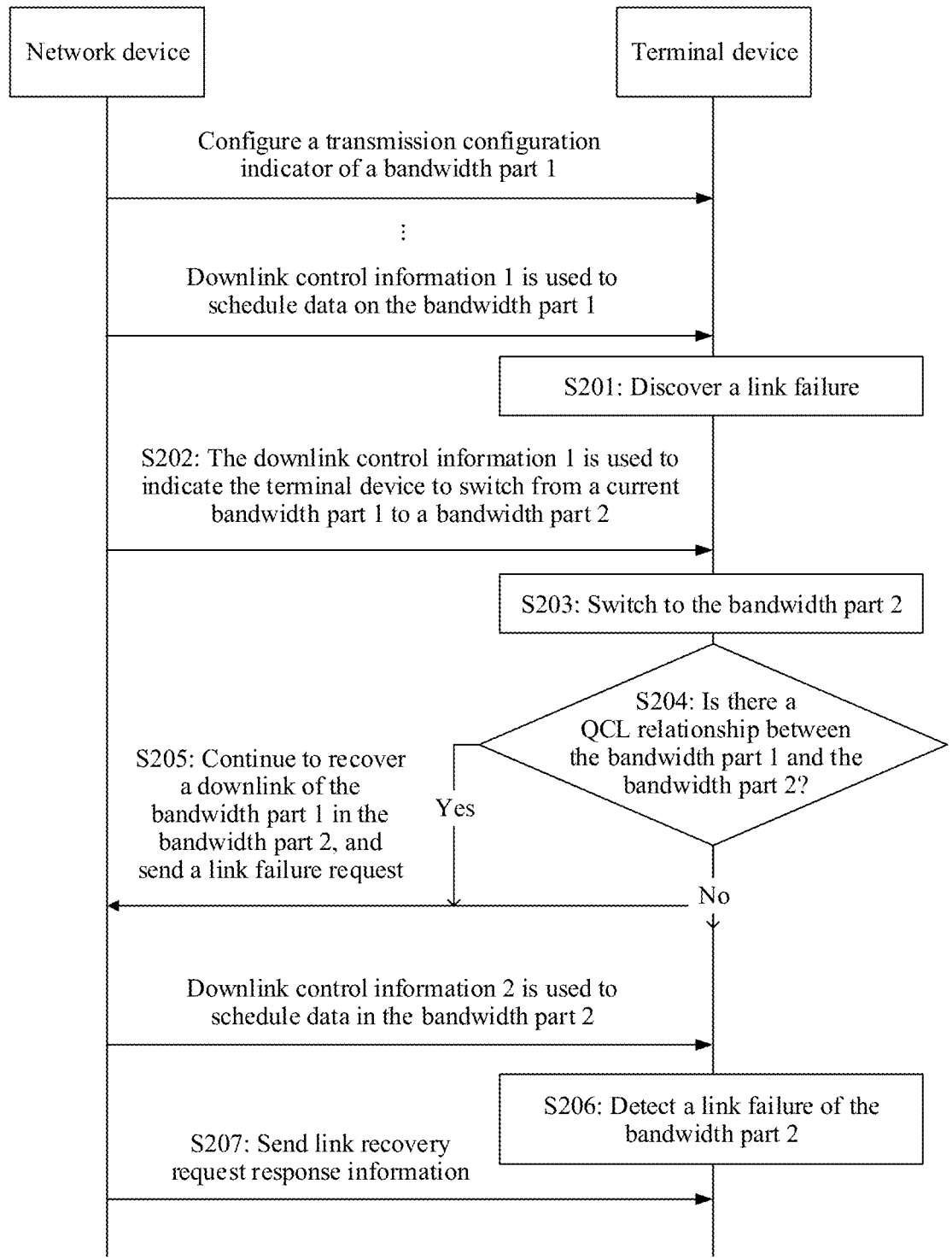
FIG. 6 is a schematic flowchart of another communication method according to an embodiment of this application.

Specifically, with reference to a schematic flowchart of another communication method shown in FIG. 6, how to recover the link of the first downlink resource of the BWP 1 and how to process the link failure of the BWP 2 in the case shown in FIG. 5 are described.

A network device configures a TCI of a BWP 1 (namely, the foregoing BWP used before switching) for a terminal device. To be specific, the network device configures a DMRS of a PDCCH and a reference signal in the TCI to have a QCL relationship, and configures a CORESET used to receive the PDCCH. The network device sends DCI 1 to schedule data in the BWP 1.

S201: The terminal device discovers a beam failure or a link failure of the BWP 1.

S202: The network device sends the DCI 1 to the terminal device, to indicate the terminal device to switch from the BWP 1 to a BWP 2 (namely, the foregoing BWP that is switched to).

S203: The terminal device switches to the BWP 2.

S204: The terminal device determines whether there is a QCL relationship between the BWP 1 and the BWP 2.

S205: If there is the QCL relationship between the BWP 1 and the BWP 2, the terminal device continues to recover a link of the BWP 1 in the BWP 2.

It should be noted that a sequence of performing S203, S204, and S205 is not limited. To be specific, an association relationship between the BWP 1 and the BWP 2 may be determined at the beginning of configuration or when switching indication information is received, or the terminal device may determine a switching behavior based on an association relationship.

Solution 1: If there is the association relationship, the terminal device switches to the BWP 2; or if there is no association relationship, the terminal device does not perform switching and continues to recover the link of the BWP 1 in the BWP 1.

Solution 2: If there is the association relationship, the terminal device switches to the BWP 2; or if there is no association relationship, the terminal device switches to the BWP 2 and no longer recovers the link of the BWP 1. After the DCI1 for indicating BWP switching is received, a beam failure recovery timer and a beam failure recovery counter are not reset but only are suspended, and sending of link recovery request information is suspended. After the BWP switching is completed, the beam failure recovery timer and/or the beam failure recovery counter are/is restarted, and the link recovery request information is sent. In addition, a beam failure detection counter is reset to perform link failure detection in the BWP 2.

In this example, that the terminal device recovers the link of a first downlink resource of the BWP 1 is further classified into the following several link recovery operations:

A. If the terminal device has identified a new downlink (new beam, or referred to as a downlink reference signal that meets a specific threshold) before the switching, the terminal device may continue to use the reference signal in the BWP 2 to initiate a link recovery request.

a1: In this case, if a PRACH resource corresponding to the reference signal exists in the BWP 2, the PRACH is used to send the link recovery request information; or if a PRACH resource corresponding to the reference signal does not exist in the BWP 2, a new reference signal is searched for in the BWP that is switched to.

a2: If a corresponding PRACH exists in the BWP 2, the terminal device uses the PRACH resource; or if a corresponding PRACH does not exist in the BWP 2, the terminal device uses a PUCCH resource or a PUSCH resource in the BWP 2 to initiate link reconfiguration for the BWP 1.

a3: A PUCCH resource is used for link recovery of the BWP 1 (where considering that different resources need to be used for the link recovery of the BWP 1 and link recovery of the BWP 2, a PRACH is used for the link recovery of the BWP2, and a PUCCH is used for link recovery of another BWP).

B. If the terminal device does not identify a new downlink (or referred to as a downlink reference signal that meets a specific threshold) before the switching, the terminal device needs to search for a new downlink reference signal in the BWP 2 to initiate a link recovery request.

b1: If a PRACH resource is used to send the link recovery request, BWP information (for example, a BWP ID/CORESET ID) needs to be carried on the PRACH resource.

b2: A PUCCH resource is used to send the link recovery request (where considering that different resources need to be used for link recovery of the BWP 1 and link recovery of the BWP 2, a PRACH is used for the link recovery of the BWP2, and a PUCCH is used for link recovery of another BWP).

b3: If a PUCCH resource is used to send the link recovery request, the request information needs to include BWP information (for example, a BWP ID/CORESET ID).

In addition, after the link of the BWP 1 is recovered, considering that the BWP 1 and the BWP 2 do not have a same CORESET, the TCI of the BWP 1 needs to be reconfigured. A configuration manner may be as follows: After the link of the BWP 1 is recovered, a reference signal resource (one of candidate reference signal resources) for which a link recovery response is received may be associated with a CORESET, configured by the network device, of the BWP 1. This configuration manner is easy to implement. Another configuration manner may be as follows: After the link of the BWP 1 is recovered, the network device is waited for to reconfigure a TCI state of the BWP 1. This configuration may not be limited to a candidate reference signal resource. Certainly, this is not limited to the two configuration manners.

DCI 2 is used to schedule data in the BWP 2.

S206: If there is no QCL relationship between the BWP 1 and the BWP 2, or when the terminal device continues to recover the link of the BWP 1 in the BWP 2, the terminal device detects a link failure of the BWP 2.

S207: The network device sends a link recovery response message to the terminal device. The terminal device receives the response message.

When the terminal device recovers the link of the first downlink resource of the BWP 1 in the BWP 2, specifically, when the link failure of a second downlink resource occurs before the link recovery response of the first downlink resource is received or reconfiguration information of the first downlink resource is received, the link failure may also occur in the BWP 2. In this case, in one manner, the recovery of the link of the first downlink resource of the BWP 1 is stopped. To be specific, sending of link recovery request information of the first downlink resource is stopped, and a link of the second downlink resource of the BWP 2 is recovered. Specifically, the beam failure recovery timer and/or counter are/is reset. A candidate beam is selected: The new beam identified in the BWP 2 is used to recover the downlink, or a beam for link recovery of the BWP 1 is used to recover the link of the second downlink resource of the BWP 2. An uplink resource is used: The link recovery request is sent through a specified PRACH, or the link recovery request is sent through a PUCCH/PUSCH/non-contention-based PRACH (where the link recovery request carries a CORESET ID, a serving beam ID, a BWP ID, or indication information, and the indication information is used to indicate whether the link of the BWP 2 or the link of the BWP 1 is recovered). In another manner, the recovery of the link of the first downlink resource of the BWP 1 is continued, and a BWP 1 ID or a BWP 2 ID is reported, or whether the link of the BWP 2 or the link of the BWP 1 is recovered is indicated.

In another embodiment, S204 to S207 may alternatively be replaced with that the terminal device recovers the link of the BWP 1 in the BWP 2 when determining that there is the QCL relationship between the BWP 1 and the BWP 2.

The alternative embodiment and the embodiment shown in FIG. 6 may be combined into the embodiment shown in FIG. 4.

Figure 7:
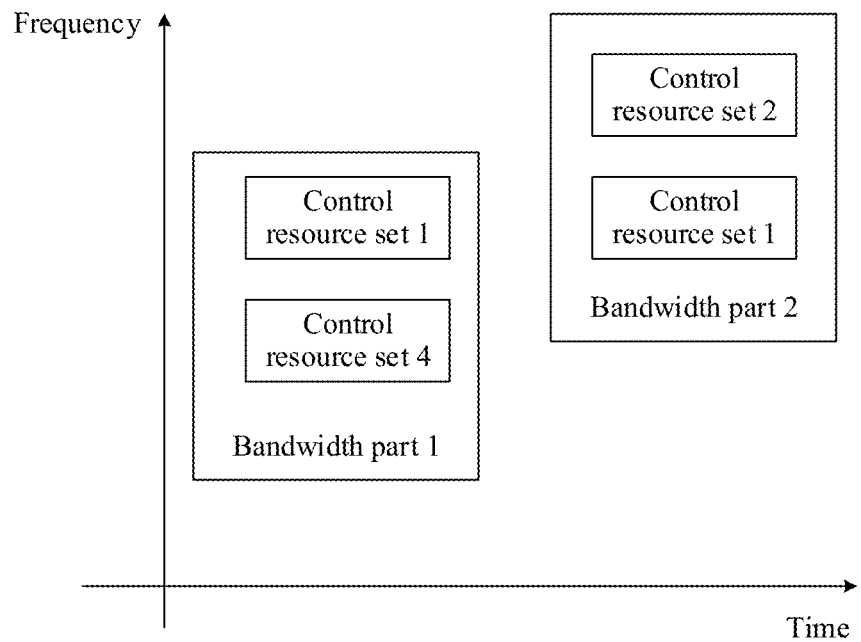

FIG. 7 is a schematic diagram of another case of CORESETs included in a BWP 1 and a BWP 2. In FIG. 7, the BWP 1 includes a CORESET 1 and a CORESET 4, and the BWP 2 includes the CORESET 1 and a CORESET 2. In other words, the BWP 1 and the BWP 2 have an intersection, and only a part of CORESET IDs in the BWP 2 are the same as a CORESET ID in the BWP 1.

The terminal device detects a link failure in the BWP 1. In this case, for recovering a link of a first downlink resource of the BWP 1 in the BWP 2, refer to the procedure shown in FIG. 6. Alternatively, a link of a first downlink resource that has an intersection with a second downlink resource of the BWP 2 is recovered in the BWP 2. For example, link recovery is performed only on a CORESET that has an intersection. As shown in FIG. 7, a same CORESET of the BWP 1 and the BWP 2 is the CORESET 1, and link recovery is performed only on the CORESET 1. Further, a link failure of the second downlink resource of the BWP 2 may also be detected.

Figure 8:
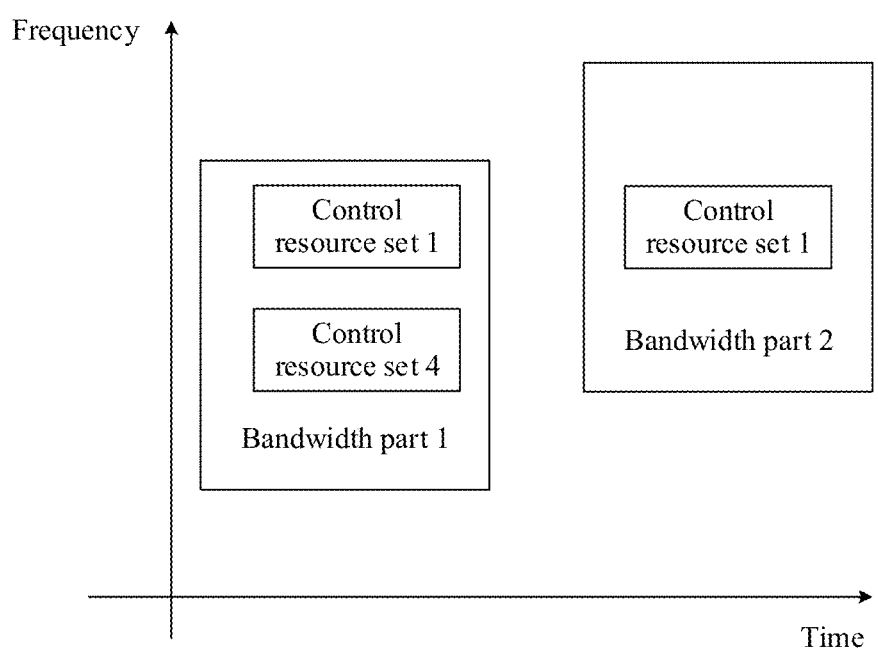

FIG. 8 is a schematic diagram of still another case of CORESETs included in a BWP 1 and a BWP 2. In FIG. 8, the BWP 1 includes a CORESET 1 and a CORESET 4, and the BWP 2 includes the CORESET 1. In other words, the BWP 1 and the BWP 2 have an intersection, and the CORESET of the BWP 2 is a subset of the CORESETs of the BWP 1. In this case, a link of the CORESET of the BWP 1 is recovered in the BWP 2. Specifically, a link failure detection counter may not be reset, and a link recovery timer and/or a link recovery counter are/is not reset.

Figure 9:
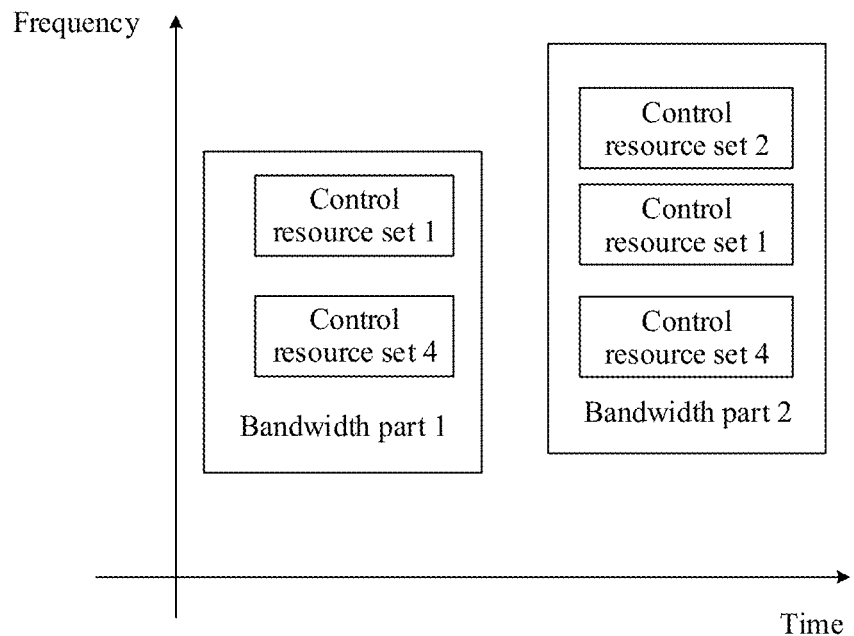

FIG. 9 is a schematic diagram of yet another case of CORESETs included in a BWP 1 and a BWP 2. In FIG. 9, the BWP 1 includes a CORESET 1 and a CORESET 4, and the BWP 2 includes the CORESET 1, a CORESET 2, and the CORESET 4. In other words, the BWP 1 and the BWP 2 have an intersection, and the CORESETs of the BWP 1 are a subset of the CORESETs of the BWP 2. In this case, a link of the CORESETs of the BWP 1 is recovered in the BWP 2 (refer to the procedure shown in FIG. 6). Further, a link failure of a CORESET, having no intersection with the BWP 1, of the BWP 2 is detected. Specifically, a link failure detection counter may be reset, and a link recovery timer and/or a link recovery counter are/is not reset. If there is no association relationship between the BWP 1 and the BWP 2, a link of a downlink resource of the BWP 1 is not recovered in the BWP 2. When a BWP switching command is received from DCI, BWP switching is not performed. The BWP switching is performed after a link recovery response to the downlink resource of the BWP 1 or TCI reconfiguration information is received. Alternatively, when the beam failure recovery timer expires or the beam failure recovery counter reaches a maximum value, a new BWP is used. According to the communication method provided in this embodiment of this application, the link of the first downlink resource of the first BWP can be accurately recovered based on the association relationship between the first BWP and the second BWP, or a specific BWP in which the link of the first downlink resource of the first BWP is recovered can be determined based on the association relationship between the first BWP and the second BWP, thereby ensuring communication reliability.

This application further provides still another communication method and communications apparatus. If detecting a link failure during timing of a BWP inactivity timer, a terminal device initiates link recovery by using a PRACH resource, does not stop the timing of the BWP inactivity timer, and when the BWP inactivity timer expires, switches to a preset BWP, thereby ensuring normal communication and improving communication stability. Alternatively, the terminal device stops or suspends the timing of the BWP inactivity timer, and after a link recovery process is completed, starts or restarts the timing of the BWP inactivity timer, thereby ensuring timing accuracy.

Figure 10A:
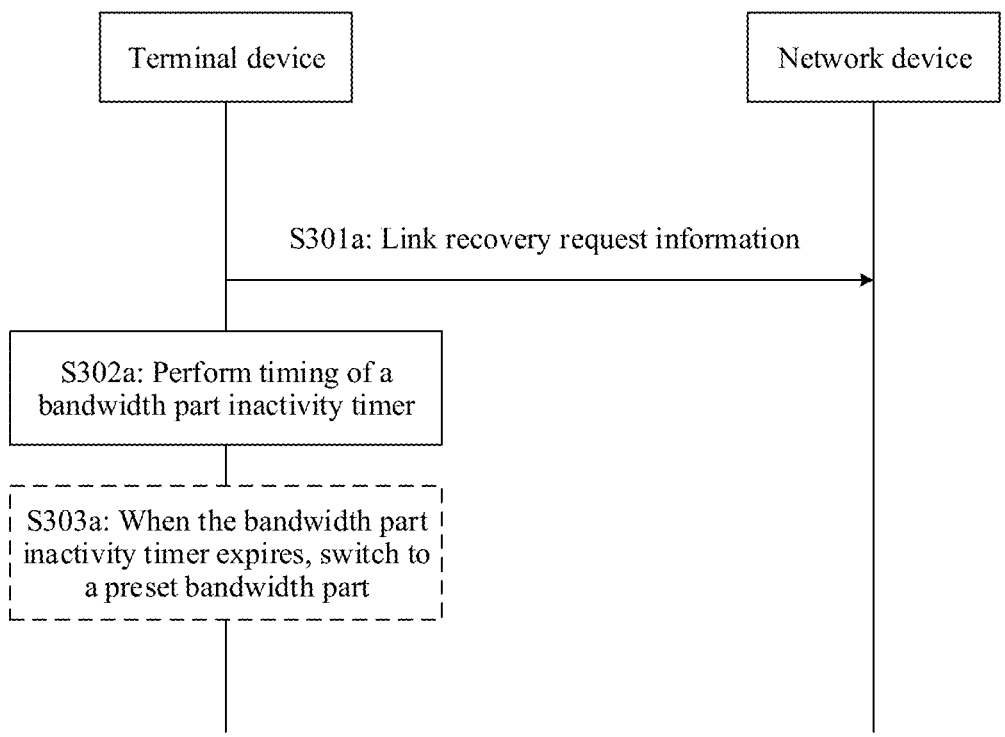
FIG. 10a is a schematic flowchart of still another communication method according to an embodiment of this application.

FIG. 10a is a schematic flowchart of still another communication method according to an embodiment of this application. Details are shown in FIG. 10a.

S301a: A terminal device sends link recovery request information to a network device on a physical random access resource. The network device receives the link recovery request information.

S302a: Perform timing of a BWP inactivity timer.

A higher layer parameter, namely, the BWP inactivity timer (bwp-InactivityTimer), is configured for the terminal device. The BWP inactivity timer is used to: observe whether control signaling such as DCI can be received in a current BWP, or switch to a preset BWP to operate if the control signaling is not received within a relatively long time. For example, at a low frequency, if the terminal device cannot detect the DCI within 1 ms, a value of the timer is increased once. At a high frequency, if the terminal device cannot detect the DCI within 0.5 ms, a value of the timer is increased once. If the DCI is received, the timer is reset. When the timer expires, the terminal device switches to the preset BWP, namely, a default BWP (specifically, a default downlink bandwidth part (default-DL-BWP)). The default BWP may be a BWP configured by using RRC or may be an initial downlink bandwidth part (initial DL BWP). Communication is performed on the default BWP, and communication quality can be ensured.

In the prior art, the terminal device determines, based on whether the DCI can be received, whether to switch to the default BWP.

If the terminal device cannot receive the DCI in the current BWP for a long time, the terminal device switches to the default BWP. If the terminal device can receive the DCI in the current BWP for a long time, the terminal device continues to operate in the BWP until the terminal device receives BWP switching indication information.

In this embodiment, if detecting a link failure during the timing of the BWP inactivity timer, the terminal device sends the link recovery request information to the network device on the physical random access resource. The terminal device does not stop the timing of the BWP inactivity timer. Or in other words, the terminal device sends random access request information and stops the timing of the BWP inactivity timer unless the sent random access request information is used for link recovery. Or in other words, the link recovery request information is sent on the physical random access resource, and the BWP inactivity timer is not stopped. When the BWP inactivity timer expires, the terminal device switches to the default BWP.

S303a: When the BWP inactivity timer expires, switch to the preset BWP.

If detecting the link failure during the timing of the BWP inactivity timer, the terminal device performs the link recovery, and the terminal device may switch to a new BWP, but communication quality of the new BWP cannot be determined. If the terminal device cannot detect the DCI within a specified time, it indicates that communication quality of the new BWP is poor. Therefore, when the BWP inactivity timer expires, the terminal device switches to the preset BWP.

Certainly, S303a is an optional step.

According to the communication method provided in this embodiment of this application, if detecting the link failure during the timing of the BWP inactivity timer, the terminal device initiates the link recovery, does not stop the timing of the BWP inactivity timer, and when the BWP inactivity timer expires, switches to the preset BWP, thereby ensuring normal communication and improving communication stability.

Figure 10B:
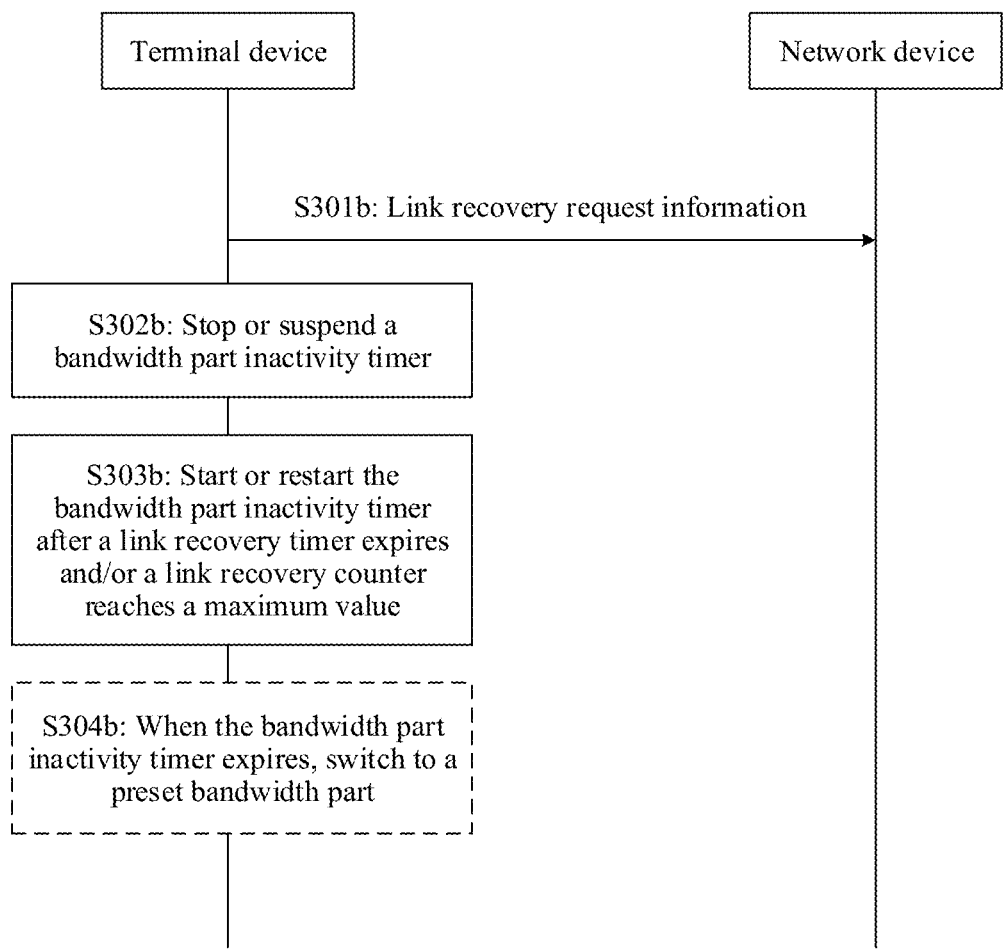
FIG. 10b is a schematic flowchart of yet another communication method according to an embodiment of this application.

FIG. 10b is a schematic flowchart of yet another communication method according to an embodiment of this application. Details are shown in FIG. 10b.

S301b: A terminal device sends link recovery request information to a network device on a physical random access resource. The network device receives the link recovery request message.

S302b: Stop or suspend a BWP inactivity timer.

If detecting a link failure during timing of the BWP inactivity timer, the terminal device performs link recovery. Because it takes some time for the link recovery, if the timing of the BWP inactivity timer continues, the timing may not be accurate enough. If a link is not recovered, the terminal device cannot receive DCI, and may directly switch to a preset or default BWP. Therefore, in this case, the timing of the BWP inactivity timer is stopped or suspended.

S303b: Start or restart the BWP inactivity timer after a link recovery timer expires and/or a link recovery counter reaches a maximum value.

When performing the link recovery, the terminal device uses a beam failure recovery counter to monitor the link recovery. In addition, a beam failure recovery timer may be further used to assist the counter in monitoring. Specifically, if the link is recovered before the link recovery counter reaches the maximum value, and/or the link is recovered within a timing time of the link recovery timer, the link recovery succeeds. If the link recovery timer expires and/or the link recovery counter reaches the maximum value but the link is still not recovered, the link recovery fails. After the link recovery timer expires and/or the link recovery counter reaches the maximum value, a link recovery process ends.

After the link recovery process ends, the BWP inactivity timer is started or restarted.

S304b: When the BWP inactivity timer expires, switch to the preset BWP.

After the BWP inactivity timer is started or restarted, based on operating of the BWP inactivity timer in the prior art, when the BWP inactivity timer expires, the terminal device switches to the preset BWP.

Certainly, S304b is an optional step.

According to the communication method provided in this embodiment of this application, if detecting the link failure during the timing of the BWP inactivity timer, the terminal device initiates the link recovery, stops or suspends the timing of the BWP inactivity timer, and after the link recovery process is completed, starts or restarts the timing of the BWP inactivity timer, thereby ensuring timing accuracy.

The foregoing describes in detail the methods in the embodiments of the present invention, and the following provides apparatuses in the embodiments of the present invention.

Figure 11:
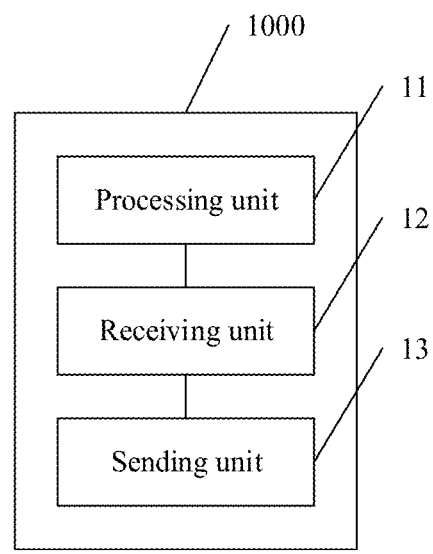
FIG. 11 is a schematic structural diagram of modules of a communications apparatus according to an embodiment of this application.

Based on a same concept as that of the communication method in the foregoing embodiment, as shown in FIG. 11, an embodiment of this application further provides a communications apparatus 1000. The communications apparatus may be applied to the communication method shown in FIG. 4. The communications apparatus 1000 may be the terminal device 200 shown in FIG. 3, or may be a component (for example, a chip) applied to the terminal device 200. The communications apparatus 1000 includes a processing unit 11, and may further include a receiving unit 12 and a sending unit 13.

The processing unit 11 is configured to determine a first bandwidth part BWP and a second BWP.

The processing unit 11 is further configured to determine an association relationship between the first BWP and the second BWP.

The processing unit 11 is configured to: recover a link of a first downlink resource of the first BWP based on the association relationship and/or detect a link failure of a second downlink resource of the second BWP based on the association relationship.

In an implementation, the receiving unit 12 is configured to receive BWP switching indication information, where the BWP switching indication information is used to indicate to switch from the first BWP to the second BWP.

In another implementation, the processing unit 11 is configured to: recover the link of the first downlink resource in the second BWP; or recover the link of the first downlink resource in the first BWP.

In still another implementation, the processing unit 11 is configured to recover the link of the first downlink resource in the second BWP based on a relationship between the first downlink resource and the second downlink resource.

In still another implementation, the processing unit 11 is configured to:

if the first downlink resource and the second downlink resource do not intersect, recover the link of the first downlink resource in the second BWP, and detect the link failure of the second downlink resource; or if the first downlink resource and the second downlink resource partially intersect, recover the link of the first downlink resource in the second BWP, or recover, in the second BWP, a link of a first downlink resource that intersects the second downlink resource, and detect the link failure of the second downlink resource; or if the second downlink resource is a subset of the first downlink resource, recover the link of the first downlink resource in the second BWP; or if the first downlink resource is a subset of the second downlink resource of the second BWP, recover the link of the first downlink resource in the second BWP, and detect a link failure of a second downlink resource that does not intersect the first downlink resource.

In still another implementation, the processing unit 11 is configured to:

suspend the recovery of the link of the first downlink resource; and continue to recover the link of the first downlink resource after switching to the second BWP.

In still another implementation, the processing unit 11 is configured to:

suspend a link recovery timer and/or a link recovery counter, and/or suspend sending of link recovery request information; and after switching to the second BWP, start or restart the link recovery timer and/or the link recovery counter, and/or send the link recovery request information.

In still another implementation, the processing unit 11 is further configured to determine the link failure of the second downlink resource after detecting the link failure of the second downlink resource.

In still another implementation, the processing unit 11 is further configured to:

when the link failure of the second downlink resource occurs before a link recovery response of the first downlink resource is received or before reconfiguration information of the first downlink resource is received, reset the link recovery timer and/or the link recovery counter, and/or stop sending link recovery request information of the first downlink resource.

In still another implementation, the sending unit 13 is configured to:

send the link recovery request information of the first downlink resource on a physical uplink control channel resource or a physical uplink shared channel resource of the second BWP; and/or send link recovery request information of the second downlink resource on a physical random access resource of the second BWP.

In still another implementation, the sending unit 13 is configured to send the link recovery request information of the first downlink resource and/or link recovery request information of the second downlink resource on a physical random access resource, a physical uplink control channel resource, or a physical uplink shared channel resource of the second BWP, where the link recovery request information includes one or more of the following information: BWP identification information, identification information of a downlink resource, or resource identification information of a reference signal associated with the downlink resource.

In still another implementation, the processing unit 11 is further configured to associate the first downlink resource with a reference signal resource associated with received link recovery response information. To be specific, information (for example, a PDCCH) carried on the first downlink resource is received based on the reference signal resource associated with the received link recovery response information. In still another implementation, the processing unit 11 is further configured to: if there is no association relationship between the first BWP and the second BWP, when the BWP switching indication information is received, skip switching to the second BWP.

In still another implementation, if there is no association relationship between the first BWP and the second BWP, the sending unit 13 is configured to send the link recovery request information of the first downlink resource in the first BWP, and/or the receiving unit 12 is configured to: receive link recovery response information of the first downlink resource, and/or receive the reconfiguration information of the first downlink resource.

In still another implementation, the processing unit 11 is further configured to switch from the first BWP to the second BWP after the link recovery response information or the reconfiguration information is received.

In still another implementation, the processing unit 11 is further configured to: if there is no association relationship between the first BWP and the second BWP, switch from the first BWP to the second BWP after the link recovery timer expires and/or the link recovery counter reaches a maximum value.

For more detailed descriptions of the processing unit 11, the receiving unit 12, and the sending unit 13, reference may be directly made to related descriptions of the terminal device in the method embodiment shown in FIG. 4, and details are not described herein again.

Figure 12:
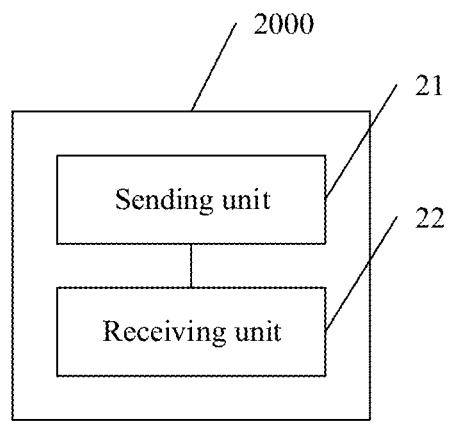
FIG. 12 is a schematic structural diagram of modules of another communications apparatus according to an embodiment of this application.

Based on a same concept as that of the communication method in the foregoing embodiment, as shown in FIG. 12, an embodiment of this application further provides a communications apparatus 2000. The communications apparatus may be applied to the communication method shown in FIG. 6. The communications apparatus 2000 may be the network device 100 shown in FIG. 3, or may be a component (for example, a chip) applied to the network device 100. The communications apparatus 2000 includes a sending unit 21 and a receiving unit 22.

The sending unit 21 is configured to send BWP switching indication information, where the BWP switching indication information is used to indicate to switch from a first BWP to a second BWP.

The receiving unit 22 is configured to receive request information that is sent by a terminal device and that is used to recover a link of a first downlink resource of the first BWP.

In an implementation, the receiving unit is configured to: if there is an association relationship between the first BWP and the second BWP, receive the link recovery request information of the first downlink resource of the first BWP in the second BWP; or if there is no association relationship between the first BWP and the second BWP, receive the link recovery request information of the first downlink resource of the first BWP in the first BWP.

In another implementation, the receiving unit is configured to receive the link recovery request information of the first downlink resource of the first BWP on a physical uplink control channel resource or a physical uplink shared channel resource of the second BWP; and/or receive the link recovery request information of the first downlink resource of the first BWP on a physical random access resource of the second BWP.

In still another implementation, the receiving unit is configured to: receive the link recovery request information of the first downlink resource of the first BWP on a physical random access resource, a physical uplink control channel resource, or a physical uplink shared channel resource of the second BWP, and/or receive link recovery request information of the second downlink resource, where the request information includes one or more of the following information: BWP identification information, identification information of a downlink resource, or resource identification information of a reference signal associated with the downlink resource.

In still another implementation, if there is no association relationship between the first BWP and the second BWP, the receiving unit is configured to: receive the link recovery request information of the first downlink resource in the first BWP, and/or send link recovery response information of the first downlink resource to the terminal device, and/or send reconfiguration information of the first downlink resource to the terminal device.

For more detailed descriptions of the sending unit 21 and the receiving unit 22, reference may be directly made to related descriptions of the network device in the method embodiment shown in FIG. 4, and details are not described herein again.

Figure 13:
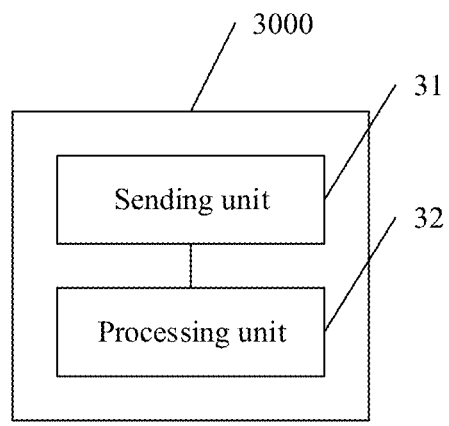
FIG. 13 is a schematic structural diagram of modules of still another communications apparatus according to an embodiment of this application.

Based on a same concept as that of the communication method in the foregoing embodiment, as shown in FIG. 13, an embodiment of this application further provides a communications apparatus 3000. The communications apparatus may be applied to the communication method shown in FIG. 10a or FIG. 10b. The communications apparatus 3000 may be the terminal device 200 shown in FIG. 3, or may be a component (for example, a chip) applied to the terminal device 200. The communications apparatus 3000 includes a sending unit 31 and a processing unit 32.

The sending unit 31 is configured to send link recovery request information on a physical random access resource, and the processing unit 32 is configured to perform timing of a bandwidth part BWP inactivity timer; or the sending unit 31 is configured to send link recovery request information on a physical random access resource, and the processing unit 32 is configured to stop a bandwidth part BWP inactivity timer.

The processing unit 32 is further configured to start or restart the BWP inactivity timer after a link recovery timer expires and/or a link recovery counter reaches a maximum value.

In an implementation, the processing unit 32 is further configured to: when the BWP inactivity timer expires, switch to a preset BWP.

For more detailed descriptions of the sending unit 31 and the processing unit 32, reference may be directly made to related descriptions of the terminal device in the method embodiment shown in FIG. 10a or FIG. 10b, and details are not described herein again.

An embodiment of this application further provides a communications apparatus. The communications apparatus is configured to perform the foregoing communication methods. Some or all of the foregoing communication methods may be implemented by using hardware, or may be implemented by using software.

Optionally, in specific implementation, the communications apparatus may be a chip or an integrated circuit.

Optionally, when some or all of the communication methods in the foregoing embodiments are implemented by using software, the communications apparatus includes a memory configured to store a program and a processor configured to execute the program stored in the memory, so that when the program is executed, the communications apparatus is enabled to implement the communication methods provided in the foregoing embodiments.

Optionally, the memory may be a physically independent unit, or may be integrated with the processor.

Optionally, when some or all of the communication methods in the foregoing embodiments are implemented by using software, the communications apparatus may alternatively include only a processor. A memory configured to store a program is located outside the communications apparatus. The processor is connected to the memory by using a circuit or wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random-access memory (RAM). The memory may also include a nonvolatile memory, for example, a flash memory, a hard disk drive (HDD), or a solid-state drive (SSD). The memory may further include a combination of the foregoing types of memories.

Figure 14:
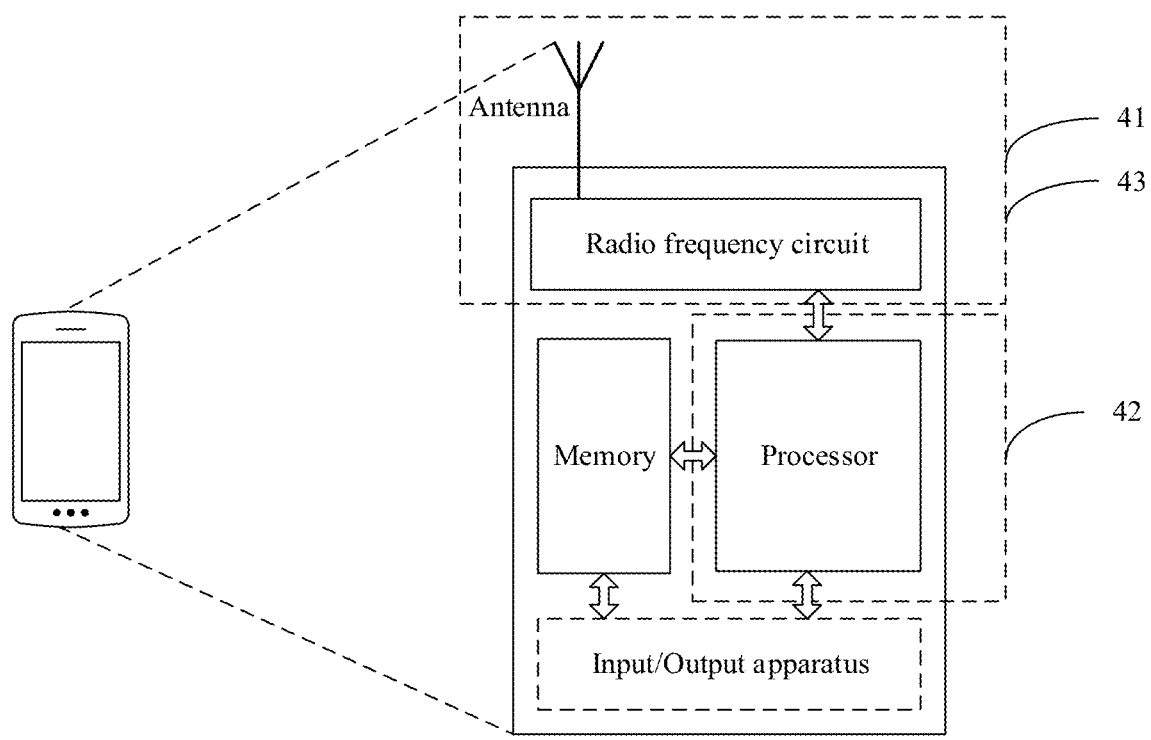
FIG. 14 is a schematic structural diagram of hardware of a communications apparatus according to an embodiment of this application.

FIG. 14 is a simplified schematic structural diagram of a terminal device. For ease of understanding and illustration, an example in which the terminal device is a mobile phone is used in FIG. 14. As shown in FIG. 14, the terminal device includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store a software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 14 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit and a sending unit (which may also be collectively referred to as a transceiver unit) of the terminal device, and the processor having a processing function may be considered as a processing unit of the terminal device. As shown in FIG. 14, the terminal device includes a receiving unit 41, a processing unit 42, and a sending unit 43. The receiving unit 41 may also be referred to as a receiver, a receiving machine, a receiving circuit, or the like. The sending unit 43 may also be referred to as a transmitter, a transmitting device, a transmitting machine, a transmitting circuit, or the like. The processing unit may also be referred to as a processor, a processing board, a processing module, a processing apparatus, or the like.

For example, in an embodiment, the receiving unit 41 is configured to perform steps S101 to S103 in the embodiment shown in FIG. 4.

For another example, in another embodiment, the sending unit 43 is configured to perform a function of the terminal device in step S301*a* in the embodiment shown in FIG. 10*a*. The processing unit 42 is configured to perform steps S302*a* and S303*a* in the embodiment shown in FIG. 10*a*.

For another example, in another embodiment, the sending unit 43 is configured to perform a function of the terminal device in step S301*b* in the embodiment shown in FIG. 10*b*. The processing unit 42 is configured to perform steps S302*b* to S304*b* in the embodiment shown in FIG. 10*b*.

Figure 15:
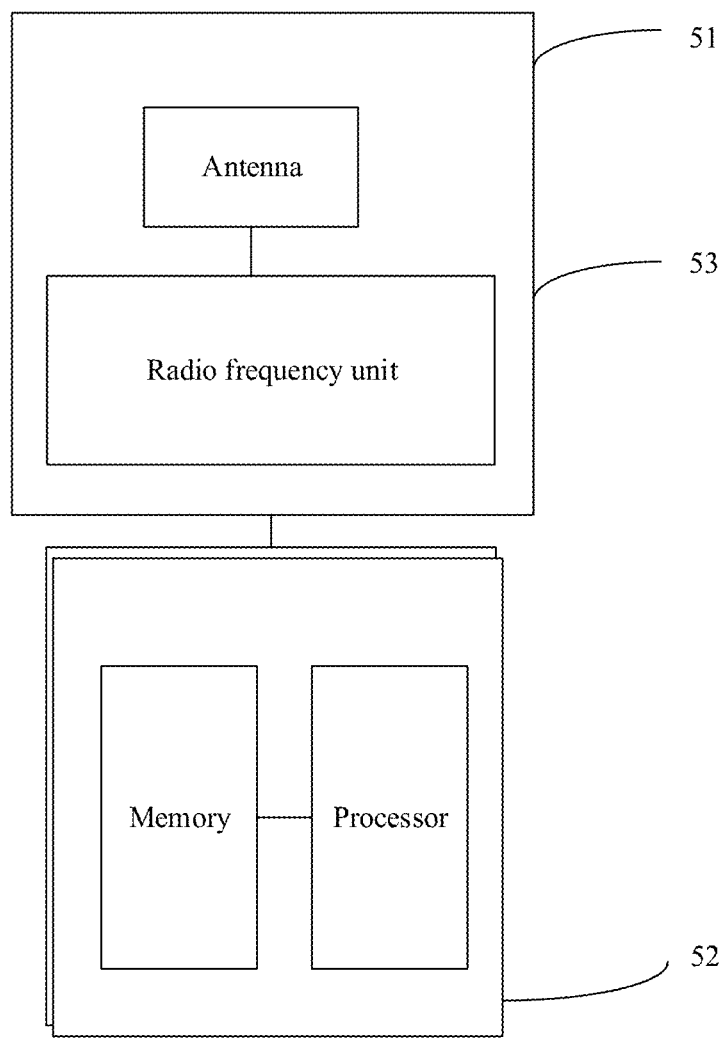
FIG. 15 is a schematic structural diagram of hardware of another communications apparatus according to an embodiment of this application.

FIG. 15 is a simplified schematic structural diagram of a network device. The network device includes a part 52 and a part for radio frequency signal receiving/sending and conversion. The part for radio frequency signal receiving/sending and conversion further includes a receiving unit 51 and a sending unit 53 (which may also be collectively referred to as a transceiver unit). The part for radio frequency signal receiving/sending and conversion is mainly configured to: send/receive a radio frequency signal and perform conversion between a radio frequency signal and a baseband signal. The part 52 is mainly configured to perform baseband processing, control the network device, and so on. The receiving unit 51 may also be referred to as a receiver, a receiving machine, a receiver circuit, or the like. The sending unit 53 may also be referred to as a transmitter, a transmitting device, a transmitting machine, a transmitter circuit, or the like. The part 52 is usually a control center of the network device, may usually be referred to as a processing unit, and is configured to control the network device to perform steps performed by the network device in the foregoing embodiments. For details, refer to the foregoing descriptions of the related parts.

The part 52 may include one or more boards. Each board may include one or more processors and one or more memories. The processor is configured to read and execute a program in the memory to implement a baseband processing function and control the network device. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an embodiment, the sending unit 53 is configured to perform a function of sending BWP switching indication information in the embodiment (not shown) shown in FIG. 4. The receiving unit 51 is configured to perform a function of receiving link information of recovering a downlink resource of a first BWP in the embodiment (not shown) shown in FIG. 4.

For another example, in another embodiment, the receiving unit 51 is configured to perform a function of the network device in step S301*a* in the embodiment shown in FIG. 10*a*.

For another example, in still another embodiment, the receiving unit 51 is configured to perform a function of the network device in step S301*b* in the embodiment shown in FIG. 10*b*.

The present invention further provides the following embodiments. It should be noted that numbers of the following embodiments do not necessarily need to comply with a number sequence of the foregoing embodiments.

Embodiment 1: A communication method includes:

determining a first bandwidth part BWP and a second BWP;

determining an association relationship between the first BWP and the second BWP; and recovering a link of a first downlink resource of the first BWP based on the association relationship and/or detecting a link failure of a second downlink resource of the second BWP based on the association relationship.

Embodiment 2: The method according to Embodiment 1 further includes:

receiving BWP switching indication information, where the BWP switching indication information is used to indicate to switch from the first BWP to the second BWP.

Embodiment 3: In the method according to Embodiment 1 or 2, the recovering a link of a first downlink resource of the first BWP based on the association relationship includes:

recovering the link of the first downlink resource in the second BWP if there is the association relationship between the first BWP and the second BWP; or recovering the link of the first downlink resource in the first BWP if there is no association relationship between the first BWP and the second BWP.

Embodiment 4: In the method according to Embodiment 3, the recovering the link of the first downlink resource in the second BWP if there is the association relationship between the first BWP and the second BWP includes:

recovering the link of the first downlink resource in the second BWP based on a relationship between the first downlink resource and the second downlink resource.

Embodiment 5: In the method according to Embodiment 4, the recovering the link of the first downlink resource in the second BWP based on a relationship between the first downlink resource and the second downlink resource includes:

if the first downlink resource and the second downlink resource do not intersect, recovering the link of the first downlink resource in the second BWP, and detecting the link failure of the second downlink resource; or if the first downlink resource and the second downlink resource partially intersect, recovering the link of the first downlink resource in the second BWP, or recovering, in the second BWP, a link of a first downlink resource that intersects the second downlink resource, and detecting the link failure of the second downlink resource; or if the second downlink resource is a subset of the first downlink resource, recovering, in the second BWP, a link of a first downlink resource that intersects the second downlink resource; or if the first downlink resource is a subset of the second downlink resource of the second BWP, recovering the link of the first downlink resource in the second BWP, and detecting a link failure of a second downlink resource that does not intersect the first downlink resource.

Embodiment 6: In the method according to any one of Embodiments 3 to 5, the recovering the link of the first downlink resource in the second BWP if there is the association relationship between the first BWP and the second BWP includes:

suspending the recovery of the link of the first downlink resource; and continuing to recover the link of the first downlink resource after switching to the second BWP.

Embodiment 7: In the method according to Embodiment 6, the suspending the recovery of the link of the first downlink resource includes:

suspending a link recovery timer and/or a link recovery counter, and/or suspending sending of link recovery request information; and the continuing to recover the link of the first downlink resource after switching to the second BWP includes:

after switching to the second BWP, starting or restarting the link recovery timer and/or the link recovery counter, and/or sending the link recovery request information.

Embodiment 8: The method according to any one of Embodiments 1 to 7 further includes:

determining the link failure of the second downlink resource after detecting the link failure of the second downlink resource.

Embodiment 9: The method according to Embodiment 8 further includes:

when the link failure of the second downlink resource occurs before a link recovery response of the first downlink resource is received or before reconfiguration information of the first downlink resource is received, resetting the link recovery timer and/or the link recovery counter, and/or stopping sending link recovery request information of the first downlink resource.

Embodiment 10: In the method according to any one of Embodiments 1 to 9, the recovering the link of the first downlink resource in the second BWP includes:

sending the link recovery request information of the first downlink resource on a physical uplink control channel resource or a physical uplink shared channel resource of the second BWP; and/or sending link recovery request information of the second downlink resource on a physical random access resource of the second BWP.

Embodiment 11: In the method according to any one of Embodiments 1 to 9, the recovering the link of the first downlink resource in the second BWP includes:

sending the link recovery request information of the first downlink resource and/or link recovery request information of the second downlink resource on a physical random access resource, a physical uplink control channel resource, or a physical uplink shared channel resource of the second BWP, where the link recovery request information includes one or more of the following information: BWP identification information, identification information of a downlink resource, or resource identification information of a reference signal associated with the downlink resource.

Embodiment 12: In the method according to any one of Embodiments 1 to 11, after the link of the first downlink resource is recovered, the method further includes:

associating the first downlink resource with a reference signal resource associated with received link recovery response information.

Embodiment 13: In the method according to any one of Embodiments 3 to 12, if there is no association relationship between the first BWP and the second BWP, the method further includes:

when the BWP switching indication information is received, skipping switching to the second BWP.

Embodiment 14: In the method according to any one of Embodiments 3 to 13, the recovering the link of the first downlink resource in the first BWP if there is no association relationship between the first BWP and the second BWP includes:

sending the link recovery request information of the first downlink resource in the first BWP, and/or receiving link recovery response information of the first downlink resource, and/or receiving the reconfiguration information of the first downlink resource.

Embodiment 15: The method according to Embodiment 13 or 14 further includes: switching from the first BWP to the second BWP after the link recovery response information or the reconfiguration information is received.

Embodiment 16: In the method according to Embodiment 13 or 14, the recovering the link of the first downlink resource in the first BWP if there is no association relationship between the first BWP and the second BWP includes:

switching from the first BWP to the second BWP after the link recovery timer expires and/or the link recovery counter reaches a maximum value.

Embodiment 17: In the method according to any one of Embodiments 1 to 16, the first downlink resource is a control resource set, and/or the second downlink resource is a control resource set.

Embodiment 18: A communication method includes:

sending BWP switching indication information, where the BWP switching indication information is used to indicate to switch from a first BWP to a second BWP; and receiving link recovery request information of a first downlink resource of the first BWP.

Embodiment 19: In the method according to Embodiment 18, the receiving link recovery request information of a first downlink resource of the first BWP includes:

receiving the link recovery request information of the first downlink resource of the first BWP in the second BWP if there is an association relationship between the first BWP and the second BWP; or receiving the link recovery request information of the first downlink resource of the first BWP in the first BWP if there is no association relationship between the first BWP and the second BWP.

Embodiment 20: In the method according to Embodiment 19, the receiving the link recovery request information of the first downlink resource of the first BWP in the second BWP if there is an association relationship between the first BWP and the second BWP includes:

receiving the link recovery request information of the first downlink resource of the first BWP on a physical uplink control channel resource or a physical uplink shared channel resource of the second BWP; and/or receiving the link recovery request information of the first downlink resource of the first BWP on a physical random access resource of the second BWP.

Embodiment 21: In the method according to Embodiment 18 or 19, the receiving link recovery request information of a first downlink resource of the first BWP includes:

receiving the link recovery request information of the first downlink resource of the first BWP on a physical random access resource, a physical uplink control channel resource, or a physical uplink shared channel resource of the second BWP, and/or receiving link recovery request information of the second downlink resource, where the request information includes one or more of the following information: BWP identification information, identification information of a downlink resource, or resource identification information of a reference signal associated with the downlink resource.

Embodiment 22: In the method according to any one of Embodiments 19 to 21, the receiving the link recovery request information of the first downlink resource of the first BWP in the first BWP if there is no association relationship between the first BWP and the second BWP includes:

receiving the link recovery request information of the first downlink resource in the first BWP, and/or sending link recovery response information of the first downlink resource, and/or sending reconfiguration information of the first downlink resource.

Embodiment 23: A communication method includes:

sending link recovery request information on a physical random access resource, and performing timing of a bandwidth part BWP inactivity timer; or sending link recovery request information on a physical random access resource, stopping a bandwidth part BWP inactivity timer, and starting or restarting the BWP inactivity timer after a link recovery timer expires and/or a link recovery counter reaches a maximum value.

Embodiment 24: In the method according to Embodiment 23, the method further includes:

when the BWP inactivity timer expires, switching to a preset BWP.

Embodiment 25: A communications apparatus includes a processing unit.

The processing unit is configured to determine a first bandwidth part BWP and a second BWP.

The processing unit is further configured to determine an association relationship between the first BWP and the second BWP.

The processing unit is further configured to: recover a link of a first downlink resource of the first BWP based on the association relationship and/or detect a link failure of a second downlink resource of the second BWP based on the association relationship.

Embodiment 26: A communications apparatus includes a sending unit and a receiving unit.

The sending unit is configured to send BWP switching indication information, where the BWP switching indication information is used to indicate to switch from a first BWP to a second BWP.

The receiving unit is configured to receive link recovery request information of a first downlink resource of the first BWP.

Embodiment 27: A communications apparatus includes a sending unit and a processing unit.

The sending unit is configured to send link recovery request information on a physical random access resource; and the processing unit is configured to perform timing of a bandwidth part BWP inactivity timer; or the sending unit is configured to send link recovery request information on a physical random access resource; and the processing unit is configured to stop a bandwidth part BWP inactivity timer.

The processing unit is further configured to start or restart the BWP inactivity timer after a link recovery timer expires and/or a link recovery counter reaches a maximum value.

Embodiment 28: A communications apparatus includes a processor and a transceiver apparatus, where the processor is coupled to the transceiver apparatus, and the processor is configured to execute a computer program or an instruction, to control the transceiver apparatus to receive and send information; and when the processor executes the computer program or the instruction, the processor is further configured to implement the method according to any one of Embodiments 1 to 24.

Embodiment 29: A computer-readable storage medium is provided, where the computer-readable storage medium stores a computer program or an instruction, and when the computer program or the instruction is executed, the method according to any one of Embodiments 1 to 24 is implemented.

The network device and the terminal device in the foregoing apparatus embodiments entirely correspond to the network device or the terminal device in the method embodiments. A corresponding module or unit performs a corresponding step. For example, a sending module (transmitter) performs a sending step in the method embodiments, and a receiving module (receiver) performs a receiving step in the method embodiments, a step other than sending and receiving steps may be performed by a processing module (processor). For a function of a specific module, refer to a corresponding method embodiment. The sending module and the receiving module may form a transceiver module, and the transmitter and the receiver may form a transceiver, to jointly implement receiving and sending functions. There may be one or more processors.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. A part or all of the units may be selected based on actual requirements to achieve the objectives of the solutions of the embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid-state drive (solid-state disk, SSD).

What is claimed is:

1. A communication method, applied to a communications apparatus, the method comprising:
   determining a first bandwidth part (BWP) and a second BWP;
   determining an association relationship between the first BWP and the second BWP;
   recovering a link of a first downlink resource of the first BWP based on the association relationship and/or detecting a link failure of a second downlink resource of the second BWP based on the association relationship; and
   after the link of the first downlink resource is recovered, associating the first downlink resource with a reference signal resource associated with received link recovery response information.

2. The method according to claim 1, further comprising:
   receiving BWP switching indication information, wherein the BWP switching indication information indicates to switch from the first BWP to the second BWP.

3. The method according to claim 1, wherein the recovering the link of the first downlink resource of the first BWP based on the association relationship comprises:
   recovering the link of the first downlink resource in the second BWP; or
   recovering the link of the first downlink resource in the first BWP.

4. The method according to claim 3, wherein the recovering the link of the first downlink resource in the second BWP comprises:
   recovering the link of the first downlink resource in the second BWP based on a relationship between the first downlink resource and the second downlink resource.

5. The method according to claim 4, wherein the recovering the link of the first downlink resource in the second BWP based on the relationship between the first downlink resource and the second downlink resource comprises:
   in response to the first downlink resource and the second downlink resource not intersecting, recovering the link of the first downlink resource in the second BWP, and detecting the link failure of the second downlink resource;
   in response to the first downlink resource and the second downlink resource partially intersecting, recovering the link of the first downlink resource in the second BWP; or
   recovering, in the second BWP, the link of the first downlink resource that intersects the second downlink resource, and detecting the link failure of the second downlink resource;
   in response to the second downlink resource being a subset of the first downlink resource, recovering, in the second BWP, the link of the first downlink resource that intersects the second downlink resource; or
   in response to the first downlink resource being a subset of the second downlink resource of the second BWP, recovering the link of the first downlink resource in the second BWP, and detecting the link failure of the second downlink resource that does not intersect the first downlink resource.

6. The method according to claim 3, wherein the recovering the link of the first downlink resource in the second BWP comprises:
   suspending the recovery of the link of the first downlink resource; and
   continuing to recover the link of the first downlink resource after switching to the second BWP.

7. The method according to claim 6, wherein the suspending the recovery of the link of the first downlink resource comprises:
   suspending at least one of the following (a) (c):
   (a) a link recovery timer,
   (b) a link recovery counter, and
   (c) sending of link recovery request information; and
   wherein the continuing to recover the link of the first downlink resource after switching to the second BWP comprises:
   after switching to the second BWP, starting or restarting the following: (a) (c):
   (a) the link recovery timer,
   (b) the link recovery counter, and
   (c) sending the link recovery request information.

8. The method according to claim 1, further comprising:
   determining the link failure of the second downlink resource after detecting the link failure of the second downlink resource.

9. The method according to claim 8, further comprising:
   in response to the link failure of the second downlink resource occurring before a link recovery response of the first downlink resource is received or before reconfiguration information of the first downlink resource is received, resetting the link recovery timer and/or the link recovery counter, and/or stopping sending link recovery request information of the first downlink resource.

10. The method according to claim 1, wherein the recovering the link of the first downlink resource in the second BWP comprises:
    sending the link recovery request information of the first downlink resource on a physical uplink control channel resource or a physical uplink shared channel resource of the second BWP; and/or
    sending link recovery request information of the second downlink resource on a physical random access resource of the second BWP.

11. The method according to claim 3, wherein the recovering the link of the first downlink resource in the second BWP comprises:
    sending the link recovery request information of the first downlink resource and/or link recovery request information of the second downlink resource on a physical random access resource, a physical uplink control channel resource, or a physical uplink shared channel resource of the second BWP, wherein the link recovery request information comprises one or more of the following information: BWP identification information, identification information of a downlink resource, or resource identification information of a reference signal associated with the downlink resource.

12. The method according to claim 3, further comprising:
    in response to receiving BWP switching indication information, skipping switching to the second BWP.

13. The method according to claim 3, wherein the recovering the link of the first downlink resource in the first BWP comprises at least one of the following:
    sending link recovery request information of the first downlink resource in the first BWP,
    receiving link recovery response information of the first downlink resource, and
    receiving the reconfiguration information of the first downlink resource.

14. The method according to claim 12, further comprising:

switching from the first BWP to the second BWP after link recovery response information or the reconfiguration information is received.

15. The method according to claim 12, wherein the recovering the link of the first downlink resource in the first BWP comprises:
switching from the first BWP to the second BWP after a link recovery timer expires and/or a link recovery counter reaches a maximum value.

16. A communication method, applied to a communication apparatus, the method comprising:
sending bandwidth part (BWP) switching indication information, wherein the BWP switching indication information indicates to switch from a first BWP to a second BWP;
receiving link recovery request information of a first downlink resource of the first BWP; and
wherein after the link of the first downlink resource is recovered, the first downlink resource is associated with a reference signal resource associated with link recovery response information.

17. The method according to claim 16, wherein the receiving the link recovery request information of the first downlink resource of the first BWP comprises:
receiving the link recovery request information of the first downlink resource of the first BWP in the second BWP; or
receiving the link recovery request information of the first downlink resource of the first BWP in the first BWP.

18. The method according to claim 17, wherein the receiving the link recovery request information of the first downlink resource of the first BWP in the second BWP comprises:
receiving the link recovery request information of the first downlink resource of the first BWP on a physical uplink control channel resource or a physical uplink shared channel resource of the second BWP; and/or
receiving the link recovery request information of the first downlink resource of the first BWP on a physical random access resource of the second BWP.

19. A communications apparatus comprising:
a processor; and
a memory coupled to the processor and having processor-executable instructions stored thereon, which when executed cause the processor to:
determine a first bandwidth part (BWP) and a second BWP;
determine an association relationship between the first BWP and the second BWP;
recover a link of a first downlink resource of the first BWP based on the association relationship and/or detect a link failure of a second downlink resource of the second BWP based on the association relationship; and
after the link of the first downlink resource is recovered, associate the first downlink resource with a reference signal resource associated with received link recovery response information.

* * * * *

UNITED STATES PATENT AND TRADEMARK OFFICE
CERTIFICATE OF CORRECTION

| | |
|---|---|
| PATENT NO. | : 11,470,589 B2 |
| APPLICATION NO. | : 16/952962 |
| DATED | : October 11, 2022 |
| INVENTOR(S) | : Zhang et al. |

It is certified that error appears in the above-identified patent and that said Letters Patent is hereby corrected as shown below:

In the Claims

Claim 7: Column 32, Line 4: "suspending at least one of the following (a) (c):" should read -- suspending at least one of the following (a) - (c): --.

Claim 7: Column 32, Line 12: "the following (a) (c):" should read -- the following (a) - (c): --.

Signed and Sealed this
Twenty-eighth Day of February, 2023

*Katherine Kelly Vidal*

Katherine Kelly Vidal
*Director of the United States Patent and Trademark Office*